(12) United States Patent
Hollenbeck et al.

(10) Patent No.: US 12,001,994 B2
(45) Date of Patent: Jun. 4, 2024

(54) DELIVERY MANAGEMENT PLATFORM AND MOBILE APPLICATION

(71) Applicant: Target Brands, Inc., Minneapolis, MN (US)

(72) Inventors: Adam Hollenbeck, Minneapolis, MN (US); Asher Chaudhry, Minneapolis, MN (US); Dilip Sundarraj, Minneapolis, MN (US); Joakim Sternberg, Minneapolis, MN (US); Anna Maxam, Minneapolis, MN (US); Nathaniel Crowe, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 105 days.

(21) Appl. No.: 17/558,007

(22) Filed: Dec. 21, 2021

(65) Prior Publication Data

US 2023/0196262 A1 Jun. 22, 2023

(51) Int. Cl.
*G06Q 10/0833* (2023.01)
*G06Q 10/0836* (2023.01)

(52) U.S. Cl.
CPC ..... *G06Q 10/0833* (2013.01); *G06Q 10/0836* (2013.01)

(58) Field of Classification Search
CPC ................ G06Q 10/0833; G06Q 10/0836
See application file for complete search history.

(56) References Cited

U.S. PATENT DOCUMENTS

| 8,577,740 | B1 | 11/2013 | Murray et al. |
| 10,181,111 | B1 | 1/2019 | Kohli et al. |
| 10,467,562 | B1 | 11/2019 | Mo et al. |
| 10,489,738 | B2 | 11/2019 | Clark et al. |
| 10,664,800 | B2 | 5/2020 | Lee |
| 10,787,315 | B2 | 9/2020 | Hance et al. |
| 10,824,982 | B1 | 11/2020 | Whitehouse et al. |
| 10,885,479 | B1 | 1/2021 | Reiss et al. |
| 11,030,569 | B2 | 6/2021 | Oz et al. |
| 11,499,835 | B1 * | 11/2022 | Lauka ............ G01C 21/34 |

(Continued)

OTHER PUBLICATIONS

Piotr Chrzczonowicz, Optimization of Couriers' Routes by Determining Best Route for Distributing Parcels in Urban Traffic, 2015, p. 1-5 (Year: 2015).*

(Continued)

*Primary Examiner* — Ibrahim N El-Bathy
(74) *Attorney, Agent, or Firm* — Merchant & Gould P.C.

(57) ABSTRACT

A delivery management platform, a mobile application, and a method are disclosed. The delivery management platform can use the mobile application to manage carriers that perform deliveries of products. The delivery management platform can receive delivery schedules, group deliveries in the delivery schedules into loads, and use the mobile application both to make the loads available to carrier members and to receive events sent from carrier members. The delivery management platform can also use the mobile application to pay carriers and to receive information to update carrier data. Using the mobile application, carrier members can both interact with the delivery management platform and can assign, track, and perform deliveries.

19 Claims, 16 Drawing Sheets

(56) References Cited

U.S. PATENT DOCUMENTS

| | | | |
|---|---|---|---|
| 2015/0211258 A1* | 7/2015 | Gokcebay | E05C 1/04 |
| | | | 70/278.1 |
| 2016/0171436 A1* | 6/2016 | Ladden | G06F 3/048 |
| | | | 705/333 |
| 2016/0328669 A1 | 11/2016 | Droege | |
| 2019/0220785 A1 | 7/2019 | Tanno et al. | |
| 2019/0220942 A1* | 7/2019 | Jo | G06Q 30/0633 |
| 2021/0103892 A1* | 4/2021 | Han | G05D 1/0088 |
| 2022/0027848 A1* | 1/2022 | Kashi | G06Q 10/0836 |

OTHER PUBLICATIONS

Article, Amazon's New Sorting Centers Aim to Help with Controlling Deliveries, The Columbus Dispatch, dated: Jul. 28, 2014; 4 Pages.

Article, Target, Walmart Make Investments to Enhance Last Mile Delivery, Silberstein, Apr. 15, 2021.

* cited by examiner

| User | Carrier | Role | ID | Assigned Loads | Mobile Number |
|---|---|---|---|---|---|
| Person A | Carrier 1 | Dispatcher, Deliverer | 101 | XXXX | 999-999-9999 |
| Person B | Carrier 1 | Deliverer | 102 | XXXY, XXYX | 999-989-9999 |
| Person C | Carrier 2 | Dispatcher | 103 | | 990-979-9999 |
| Person D | Carrier 2 | Deliverer | 104 | XXYY, XYXX | 990-969-9999 |
| Person E | Carrier 2 | Deliverer | 105 | XYXY | 990-959-9999 |
| Person F | Carrier 2 | Deliverer | 106 | XYYX, XYYY, YXXX | 990-949-9999 |
| Person G | Carrier 3 | Dispatcher, Deliverer | 107 | YXXY | 993-939-9999 |

CARRIER DATA 300

FIG. 3

| Delivery ID | Pickup Location | Pickup Time | Drop-Off Location | Drop-Off Time | Other Info |
|---|---|---|---|---|---|
| 1 | Store A | 06:45 | Mixing Center 1 | 07:15 | |
| 2 | Store B | 06:45 | Mixing Center 1 | 07:20 | Heavy |
| 3 | Store C | 06:55 | Mixing Center 1 | 07:25 | |
| 4 | Store D | 06:55 | Mixing Center 2 | 07:25 | Bulky |
| 5 | Store B | 06:55 | Mixing Center 1 | 07:30 | |
| 6 | Store E | 07:15 | Mixing Center 1 | 07:40 | Park in ramp |
| 7 | Store A | 07:20 | Mixing Center 1 | 07:50 | Call when arriving |
| 8 | Store F | 07:30 | Mixing Center 2 | 08:15 | |
| 9 | Store D | 07:30 | Mixing Center 1 | 08:00 | |
| 10 | Store G | 07:30 | Mixing Center 2 | 08:15 | |

DELIVERY SCHEDULE 402

DELIVERY MANAGEMENT PLATFORM 202

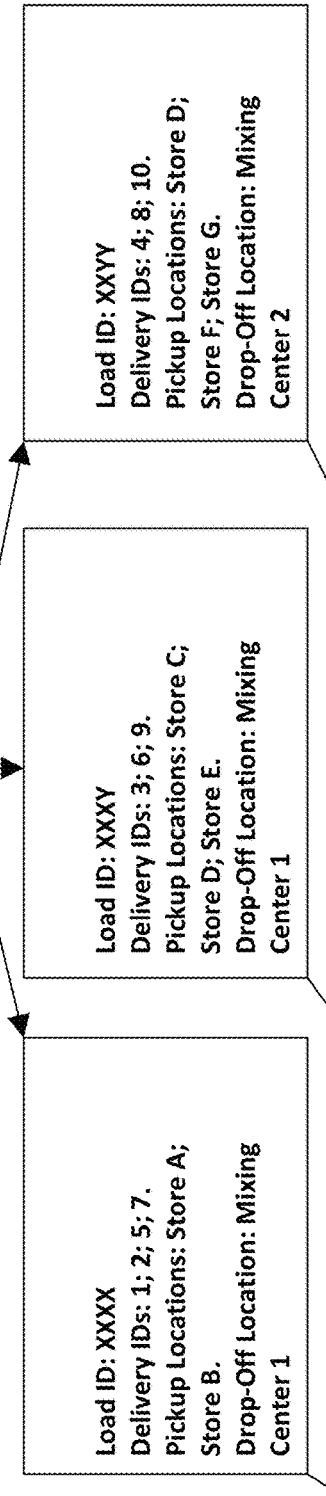

Load ID: XXXX
Delivery IDs: 1; 2; 5; 7.
Pickup Locations: Store A; Store B.
Drop-Off Location: Mixing Center 1
404a Load ID: XXXY
Delivery IDs: 3; 6; 9.
Pickup Locations: Store C; Store D; Store E.
Drop-Off Location: Mixing Center 1
404b Load ID: XXYY
Delivery IDs: 4; 8; 10.
Pickup Locations: Store D; Store F; Store G.
Drop-Off Location: Mixing Center 2
404c

FIG. 4

| Load ID | Carrier | Status | Scheduled First Pickup | Actual First Pickup | Scheduled Drop-Off | Actual Drop-Off | Notes |
|---|---|---|---|---|---|---|---|
| XXXX | Carrier 1 | Completed | 05/09/22, 06:45 | 05/09/22, 06:43 | 05/09/22, 07:50 | 05/09/22, 07:45 | |
| XXXY | Carrier 1 | Completed | 05/09/22, 06:55 | 05/09/22, 07:05 | 05/09/22, 08:15 | 05/09/22, 08:17 | |
| XXYX | Carrier 1 | In Transit | 05/09/22, 07:30 | 05/09/22, 07:30 | 05/09/22, 09:00 | | |
| XXYY | Carrier 2 | Delayed | 05/09/22, 07:30 | | 05/09/22, 09:15 | | Vehicle Issues |
| XYXX | Carrier 2 | In Transit | 05/09/22, 08:30 | | 05/09/22, 10:30 | | |
| XYXY | Carrier 2 | Pending | 05/10/22, 06:30 | | 05/10/22, 09:30 | | |
| XYYY | Unassigned | Unassigned | | | | | |

MONITORING DATA 500

FIG. 5

DELIVERY MANAGEMENT PLATFORM AND MOBILE APPLICATION

BACKGROUND

There are various supply chain models for shipping products. For example, products can be shipped from a vendor to a distribution center and then to a store, where they are bought by customers. As another example, products can be shipped from a vendor to a distribution center and then directly to a customer's residence. In another example, stores can serve as points of sale and as distribution centers. That is, products can be bought at stores, and products can be shipped from stores. Because stores are often closer to customers' residences, such a model has benefits, including faster delivery times and lower delivery costs.

However, using stores as places from which to ship products has challenges. For example, stores, which are often designed for in-person sales, may not have the space, personnel, or equipment to efficiently sort or store products for delivery to customers' residences. Furthermore, a store may have inventory constraints that limit its ability to serve as a place from which to ship products.

Another challenge is the actual transportation of products shipped from stores. For instance, shipping entities presently operating in supply chains are often not designed for such a shipping phase. Large-scale freight companies may not be interested in picking products up from stores, and smaller-scale entities may not have the capacity. In other words, there is no good fit. Furthermore, whatever the shipping solution is, it can be expensive for an entity to pay third-party shipping companies and difficult to interact with systems used by third-party shipping companies.

SUMMARY

In general, the subject matter of the present disclosure relates to a delivery management platform. More specifically, the subject matter of the present disclosure relates to a system that integrates a mobile application, mobile devices, a management platform, and other systems and databases to manage deliveries.

In an example aspect, a delivery management platform comprising a processing unit and a memory coupled to the processing unit, the memory including instructions that, when executed by the processing unit, cause the delivery management platform to: convert a delivery schedule into a load; send the load to a first mobile device, wherein the first mobile device receives the load by using a mobile application; and receive an event from a second mobile device, wherein the second mobile device sends the event by using the mobile application; wherein the delivery schedule comprises a plurality of deliveries; wherein each deliver of the plurality of deliveries comprises a pickup location and a drop-off location; and wherein the load comprises a delivery of the plurality of deliveries.

In a second aspect, a mobile delivery tool comprising: a mobile computing device comprising a processing unit and a memory; and a mobile application comprising instructions stored on the memory, wherein the instructions, when executed by the processing unit, cause the mobile application to: receive a load comprising a delivery; display an assigned loads user interface on a screen of the mobile computing device, the assigned loads user interface comprising information related to at least one load; display an active load user interface on the screen of the mobile computing device, the active load user interface comprising information related to performing the delivery of the load, wherein the information related to performing the delivery of the load comprises a pickup location, a drop-off location, and a map, the map comprising a location of the mobile computing device; and transmit an event to a management platform.

In a third aspect, a delivery management system includes a plurality of mobile devices having a mobile application installed thereon, the plurality of mobile devices including at least a first mobile device and a second mobile device. The delivery management system further includes a delivery platform including a processing unit and a memory coupled to the processing unit, the memory storing instructions that, when executed by the processing unit, cause the delivery management platform to: convert a delivery schedule into a plurality of loads; send at least one load of the plurality of loads to the first mobile device; and receive an event from the second mobile device. The delivery schedule comprises a plurality of deliveries, and each delivery of the plurality of deliveries comprises a pickup location and a drop-off location. The load comprises a delivery of the plurality of deliveries.

BRIEF DESCRIPTION OF THE DRAWINGS

FIG. 3 illustrates example carrier data.

FIG. 4 illustrates an example delivery schedule and an example block diagram.

FIG. 5 illustrates example monitoring data.

DETAILED DESCRIPTION

Figure 1:
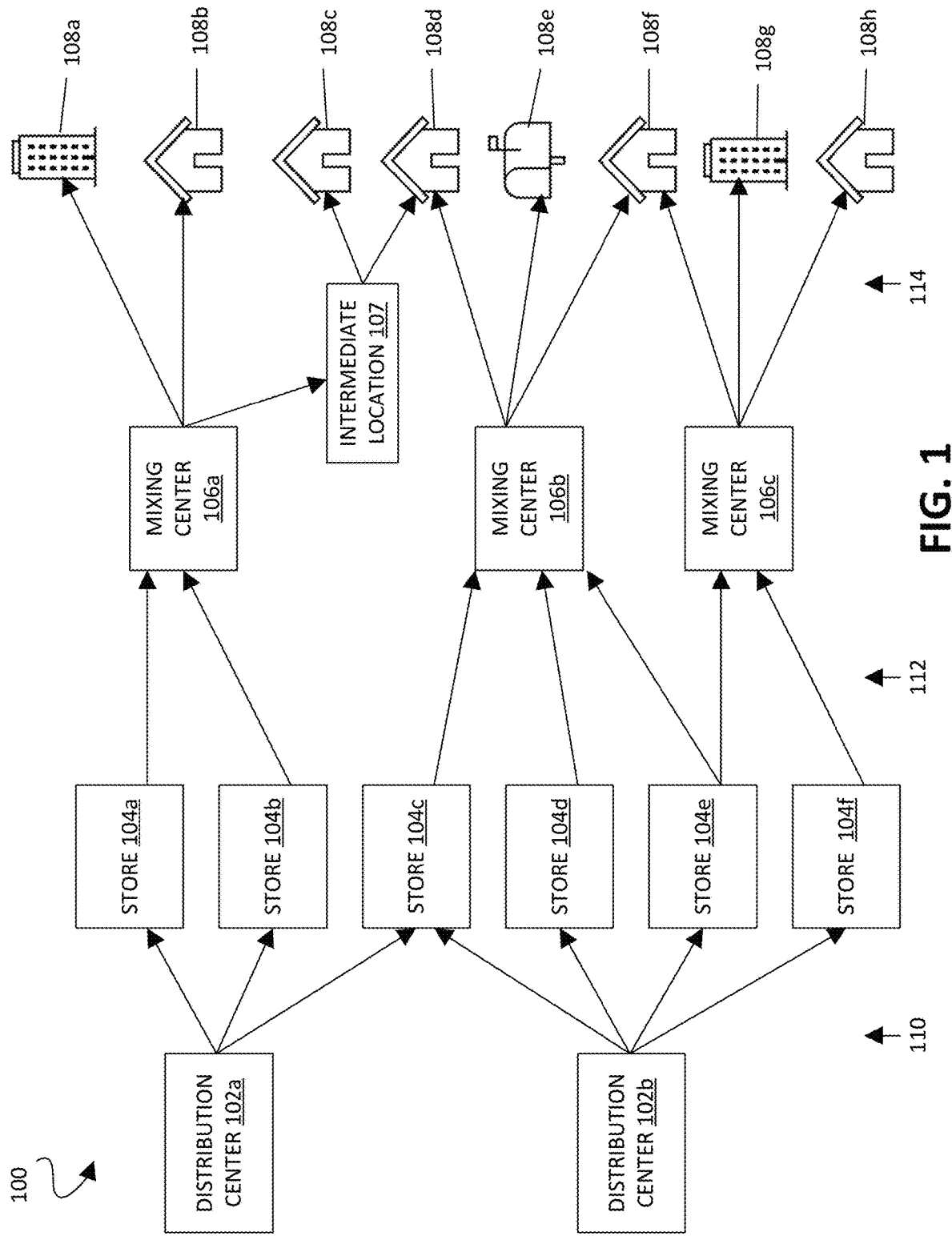
FIG. 1 illustrates a block diagram of an example retail supply chain.

As briefly described above, embodiments of the present disclosure relate to a platform and mobile application to manage deliveries. When a product is ordered online, it can be shipped from a variety of locations. One possible location is a store. Instead of shipping the product directly from a store to its final destination, however, the product can first be shipped from the store to a mixing center. The mixing center can receive and consolidate products from a variety of stores. At the mixing center, products can be sorted for the last leg of the delivery, which can be from the mixing center to the customer's residence. Sorting products at the mixing center can improve the efficiency of the last leg of the delivery. For example, products can be grouped based on the geographic proximity of their final destination, based on their delivery date or time, based on the type of vehicle that will deliver them, or based on sorting algorithms. Furthermore, by receiving products from many stores, mixing centers can have a greater quantity and diversity of inventory than is available in a store.

In example aspects, the delivery management platform described herein manages deliveries from stores to mixing centers. The delivery management platform communicates with a third-party carrier or, via a mobile application, with users of mobile devices, who perform the deliveries from stores to mixing centers. In some embodiments, the mobile application is created by the same entity that operates the delivery management platform, thereby giving the entity more control over delivery management.

In example aspects, users of the mobile devices can be members of carrier organizations. The carrier organizations can, in some embodiments, contract with the entity that operates the delivery management platform to perform the deliveries between stores and mixing centers. As described below, carrier members can be dispatchers, deliverers, or both. The carrier members can use the mobile application to interact with the delivery management platform.

In example aspects, the delivery management platform is configured to receive a delivery schedule. The delivery schedule can include deliveries from stores to mixing centers. When the delivery management platform receives the delivery schedule, it can group the deliveries into loads and assign the loads to carriers, which can include carriers using the mobile application or third-party carriers. The delivery management platform can then make a load available to a third-party carrier or, via the mobile application, to the dispatcher of a carrier. The dispatcher, in turn, can use the mobile application to accept the load and assign it to a deliverer of the carrier, who receives the load via the mobile application and performs the deliveries that make up the load.

In example aspects, the dispatchers and deliverers use the mobile application to send events to the platform. For example, if a dispatcher assigns a load to a deliverer, the mobile application can send an assignment event to the delivery management platform. As another example, if a deliverer arrives at a store, the mobile application can automatically detect the deliverer's location and send a pickup arrival event to the platform. Furthermore, the mobile application can provide members of a carrier organizations with user interface screens to, among other things, register with the platform, receive loads from the platform, assign loads, view loads, perform deliveries of a load, send events, track events, and receive payment.

In example aspects, the platform can log events and send them to a system to analyze, among other things, carrier performance, inventory data, or shipping statistics. Additionally, in response to receiving an event indicating that a load has been completed, the platform can use a system to verify that the deliveries of the load have, in fact, been shipped from stores to mixing centers. And after verification, the platform can manage the payment to the carrier or carrier members that performed the deliveries of the load.

Certain embodiments of the present disclosure have technical features that make them particularly advantageous over existing tools. For example, certain embodiments of the present disclosure provide an integrated mobile solution for managing and performing deliveries. That is, through the mobile application, a carrier member can, among other things, register with the platform, receive and assign deliveries, report events related to deliveries, track deliveries, and receive payment. This integrated mobile solution makes it easier for carriers to interact with the delivery management platform, and consequently, such a mobile solution makes performing deliveries more efficient. Moreover, in certain embodiments, the delivery management platform and the mobile application are operated by the same entity, thereby giving the entity extensive control and flexibility. Such control and flexibility make it easier, cheaper, and more efficient for the entity to add, drop, change, and otherwise interact with carriers. There is, in some instances, less need to rely on third-party mobile applications, third-party business or technical protocols, or third-party systems.

Furthermore, certain embodiments described herein retain the benefits of fulfilling customer orders by shipping from stores. These benefits can include cheaper, faster, and more efficient deliveries. Furthermore, certain embodiments described herein combine a variety of systems (e.g., a verification system, a payment system, and a registration system) into one platform that can manage interactions with the carriers via the mobile application. Furthermore, in certain embodiments, the platform described herein can interface with third-party systems, thereby increasing the ways in which the platform can be integrated with various carrier systems. Furthermore, certain embodiments described herein improve data collection and analytics by receiving and logging events in real-time that are automatically or manually sent by the mobile application. Consequently, by improving data collection and analytics, delivery efficiency, coordination, and carrier management can be improved. As will be apparent, these are only some of the advantages offered by the invention of the present disclosure.

FIG. 1 illustrates a block diagram of an example supply chain 100. An entity can use the supply chain 100 to transport a product. The supply chain 100 comprises distribution centers 102a-b, stores 104a-f, mixing centers 106a-c, an intermediate location 107, and final destinations 108a-h. In some embodiments, the stores 104a-f can be retail stores having a physical location. As briefly described above, the mixing centers 106a-c can be physical locations that receive products from a plurality stores, and that consolidate and sort these products for efficient delivery to their next locations. In some embodiments, the stores 104a-f and the mixing centers 106a-c can be owned by the same entity. In some embodiments, the final destinations 108a-h can be residences, office buildings, post office boxes, or any other locations that a product can be delivered to.

The supply chain 100 illustrates three shipping phases: a first shipping phase 110, a second shipping phase 112, and a third shipping phase 114. In the first shipping phase 110, a product can, for example, be shipped from one of the distribution centers 102a-b to one of the stores 104a-f. In the second shipping phase 112, a product can, for example, be shipped from one of the stores 104a-f to one of the mixing center 106a-c. In the third shipping phase 114, a product can, for example, be shipped from one of the mixing centers 106a-c to one of the final destinations 108a-h. In some embodiments, the third shipping phase can include an intermediate location 107. For example, a product can be shipped from one of the mixing centers 106a-c to the intermediate location 107 before being shipped to one of the final destinations 108a-h. In some embodiments, the intermediate location 107 can be a United States Postal Service office; in other embodiments, the intermediate location 107 can be a different location that receives a product from a mixing center and from which a product can be shipped to a final destination. In addition to the three shipping phases shown, a product can be shipped to or from more than the locations shown in the supply chain 100. For example, a product can be shipped from a vendor location to one of the distribution centers 102*a-b*. Furthermore, a supply chain can have fewer locations or shipping phases than those illustrated in the supply chain 100.

As illustrated, the second shipping phase 112 is different than the first shipping phase 110 and the third shipping phases 114. In the second shipping phase 112, for example, the products are being consolidated from many locations (e.g., stores 104*a-f*) to fewer locations (e.g., mixing center 106*a-c*). Furthermore, the second shipping phase 112 is different because the pickup locations are stores, and the destination locations are not final product destinations. Additionally, the size of the loads shipped during the second shipping phase 112 can be different than the size of the loads shipped during the first shipping phase 110 or the third shipping phase 114. For example, the size of the loads shipped in the second shipping phase 112 can be smaller than the loads shipped in the first shipping phase 110 and larger than the loads shipped in the third shipping phase 114. Advantageously, embodiments of the present disclosure can manage deliveries in the second shipping phase 112. Accordingly, an entity can, using embodiments of the present disclosure, perform deliveries in the second shipping phase 112 without using solutions used in the first shipping phase 110 (e.g., large-scale freight) or in the third shipping phase 114 (e.g., door-to-door deliverers). Furthermore, in some embodiments, aspects of the present disclosure can be used to perform deliveries of the third shipping phase, such as deliveries between the mixing center 106*a* and the intermediate location 107.

Figure 2:
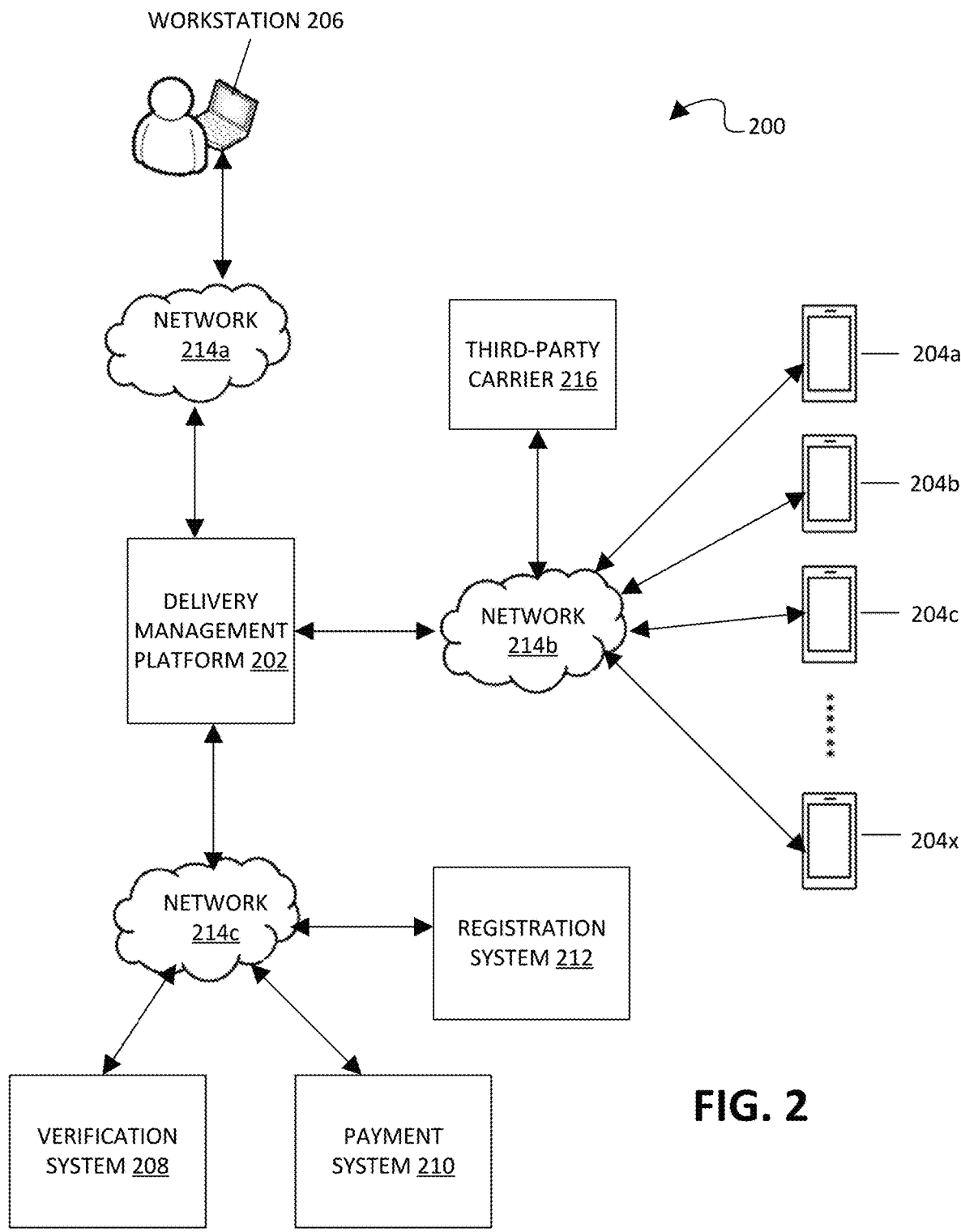
FIG. 2 illustrates a network in which aspects of the present disclosure can be implemented.

FIG. 2 illustrates an example delivery management network environment 200 in which aspects of the present disclosure can be implemented. The delivery management network environment 200 comprises a delivery management platform 202, a plurality of mobile devices 204*a-x*, a workstation 206, a verification system 208, a payment system 210, a registration system 212, a third-party carrier 216, and networks 214*a-c*. A shown, the network 214*a* couples the delivery management platform 202 with the workstation 206; the network 214*b* couples the delivery management platform 202 with the mobile devices 204*a-x* and the third-party carrier 216; and the network 214*c* couples the delivery management platform 202 with the verification system 208, the payment system 210, and the registration system 212. Each network of networks 214*a-c* can be, for example, a wireless network, a wired network, a virtual network, the Internet, or any other type of network. Furthermore, each network of the networks 214*a-c* can be divided into subnetworks, and the subnetworks can be different types of networks or the same type of network. The delivery management platform 202, the mobile devices 204*a-x*, the workstation 206, the verification system 208, the payment system 210, the registration system 212, and the third-party carrier 216 can be implemented in a computing environment such as the computing environment 1502, as is further described below in connection with FIG. 15. Furthermore, in some embodiments, any one or more of the delivery management platform 202, the workstation 206, the verification system 208, the payment system 210, the registration system 212, and the third-party carrier 216 can be implemented in the same computing environment.

The delivery management platform 202 can manage deliveries between stores and mixing centers, such as the stores 104*a-f* and the mixing centers 106*a-c* of FIG. 1. To manage deliveries, the management platform can, among other things, interface with the third-party carrier 216 and, via a mobile application, with the mobile devices 204*a-x*, as is further described above and below.

A mobile device of the mobile devices 204*a-x* can be a smartphone, a tablet, a small computer, or any other mobile computing device. Each mobile device of the mobile devices 204*a-x* can have a user, and the user can be a member of a carrier organization. Carrier organizations, and members of carrier organizations, are further described below. Each mobile device of the mobile devices 204*a-x* can use an instance of a mobile application to communicate with the delivery management platform 202. The mobile devices 204*a-x* can, for example, download the mobile application from an application store, such as Google Play or Apple's App store, or the mobile devices 204*a-x* can receive the mobile application directly from the delivery management platform 202. In some embodiments, mobile devices of the mobile devices 204*a-x* can use different versions of the mobile application. As is further described below, the mobile application can include various user interfaces. In some embodiments, the mobile application can be created and administered by the same entity that created and operates the delivery management platform 202.

In some embodiments, the delivery management platform 202 can be integrated with one or more third-party carriers, such as the third-party carrier 216. The third-party carrier 216 can be, for example, an entity that provides transportation or logistics services. When integrated with the delivery management platform 202, the third-party carrier 216 can, for example, receive loads from the delivery management platform 202 and perform deliveries. In some embodiments, the third-party carrier 216 may use its own software or system—rather than use the mobile application used by the mobile devices 204*a-x*—to interact with the delivery management platform 202.

The delivery management platform 202 can, among other things, make available one or more loads to the third-party carrier 216, receive event data and other information from the third-party carrier 216, monitor deliveries being performed by the third-party carrier 216, register and pay the third-party carrier 216, and perform other actions with respect to the third-party carrier 216. In some embodiments, the delivery management platform 202 can expose an application programming interface (API) that can be used for communication between the third-party carrier 216 and the delivery management platform 202. In some embodiments, both the third-party carrier 216 and the mobile devices 204*a-x* can use the API to communicate with the delivery management platform 202, for example to send events to the delivery management platform 202, as is further described below.

The workstation 206 can receive data from the delivery management platform 202. For example, the delivery management platform 202 can send the workstation 206 data related to the mobile devices 204*a-x*, to the users of the mobile devices 204*a-x*, to events sent by the mobile devices 204*a-x*, to the third-party carrier 216, and to any other aspects of the present disclosure. Having received such data, the workstation 206 can display the data, for example via a user interface, for subsequent analysis by a user of the workstation 206. Additionally, the workstation 206 can send data to the delivery management platform 202. For example, the workstation 206 can send a delivery schedule to the delivery management platform 202. In some embodiments, the workstation 206 can also send a message to the delivery management platform 202 for delivery to one or more mobile devices of the mobile devices 204a-x or to the third-party carrier 216. In some embodiments, the workstation 206 can edit data stored in the delivery management platform 202. In some embodiments, the workstation 206 and the delivery management platform 202 can be owned and operated by the same entity.

The verification system 208 can verify that a delivery has been completed. As is further described below in connection with FIGS. 6-7, users of the mobile devices 204a-x can perform deliveries of loads. Upon completion, the mobile devices 204a-x can send, in response, for example, to receiving a user input, an event to the delivery management platform 202. The event can be, for example, a load complete event. The delivery management platform 202 can then use the verification system 208 to verify that the deliveries have been completed. In some embodiments, the verification system 208 can verify that a delivery has been completed by processing images from a mixing center or by communicating with systems connected with the mixing center. In some embodiments, the verification system 208 is communicatively coupled with mobile devices of the mobile devices 204a-x. In some embodiments, the third-party carrier 216 can perform deliveries of loads, and the verification system 208 can verify that those deliveries were, in fact, performed. In some embodiments, the verification system 208 can verify that a delivery has been completed by using tracking data of delivered products. Upon verifying, or failing to verify, that a delivery has been completed, the verification system 208 can send a notification to the delivery management platform 202.

The payment system 210 can manage payments to carriers. The payment system 210 can be operatively coupled to payment records, accounting systems, and any other systems required for an entity to process payments. Upon receiving verification from the verification system 208 that the deliveries of a load have been completed, the delivery management platform 202 can, for example, use the payment system 210 to pay any one or more of the deliverer that performed the deliveries, the dispatcher of the carrier that the deliverer belongs to, or the carrier that the deliverer belongs to. In some embodiments, the payment system 210 can directly send the payment to the mobile devices 204a-x or directly to the third-party carrier 216. In some embodiments, the payment system 210 can, after performing any actions required to process the payment, send the payments to the mobile devices 204a-x or to the third-party carrier 216 via the delivery management platform 202.

The registration system 212 can assist the delivery management platform 202 in registering new carriers, dispatchers, or deliverers. The registration system 212 can receive registration information from the delivery management platform 202 and verify that the information is sufficient and that it meets the criteria for a valid registration. In some embodiments, the registration system 212 requires different information depending on whether a deliverer, dispatcher, or carrier is being registered, or depending on whether the carrier is a third-party carrier. Furthermore, the registration system 212 can be operatively coupled to other systems used during a registration process. After verifying that a registration is valid, the registration system 212 can send a notification and any other information to the delivery management platform 202, to the registering mobile device of the mobile devices 204a-x, or to the third-party carrier 216. In some embodiments, the registration system 212 is operatively coupled directly with the mobile devices 204a-x. In such embodiments, a mobile device can register directly with the registration system 212, thereby not interacting with the delivery management platform 202 until after the mobile device is registered.

FIG. 3 illustrates example carrier data 300. In the example of FIG. 3, the carrier data 300 contains data for a carrier that uses the mobile application; in other examples, the carrier data can pertain to the third-party carrier 216. The carrier data 300 can be stored in a database of the delivery management platform 202, or the carrier data 300 can be stored in a database communicatively coupled to the delivery management platform 202. The carrier data 300 includes data related to the users of the mobile devices 204a-x. Each user can belong to a carrier, and each carrier can include dispatchers and deliverers. In some embodiments, the dispatchers receive loads from the delivery management platform 202 and assign the loads to deliverers of the dispatcher's carrier. In some embodiments, the delivery management platform 202 can assign a load to a carrier, and a deliverer of the carrier can assign the load to herself or to himself. A user can be both a dispatcher and a deliverer.

As is further described below in connection with FIG. 8, the delivery management platform 202 can receive a registration request from a mobile device. The registration request can be a request to register a new carrier or a request to register a new dispatcher or deliverer for a carrier that is already in the carrier data 300. In response to receiving and processing the registration request, the delivery management platform 202 can edit the carrier data 300. Similarly, the delivery management platform can remove data from or edit data in the carrier data 300 if a user is no longer active or if data for a user is updated.

Advantageously, by storing the carrier data 300, the delivery management platform 202 can, among other things, interact with, add, update, and remove users of the mobile devices 204a-x without relying on a third-party service. Furthermore, the delivery management platform 202 can use the carrier data 300 to turn a delivery schedule into loads, to facilitate the tracking of deliveries, and to accurately and efficiently communicate with the users of the mobile devices 204a-x.

FIG. 4 illustrates a delivery schedule 402, loads 404a-c, and the delivery management platform 202. As illustrated, and as further explained in connection with FIG. 5, the delivery management platform 202 can receive the delivery schedule 402 and convert the delivery schedule 402 into the loads 404a-c. In some embodiments, the workstation 206 or another system can send the delivery schedule 402 to the delivery management platform 202. In some embodiments, the delivery management platform 202 can create the delivery schedule 402 based in part on product orders.

The delivery schedule 402 includes deliveries that are scheduled to be picked up from a pickup location at a certain time and to be dropped off at a drop-off location at a certain time. Each delivery can be generated based on one or more customer orders, and, therefore, each delivery can include one or more products to be delivered. The deliveries can correspond to deliveries in the second shipping phase 112 of FIG. 1, which are the deliveries from stores 104a-f to mixing centers 106a-c. The delivery schedule 402 can further include identification numbers, notes, information regarding the products to be delivered, and other information related to scheduled deliveries.

As illustrated, the delivery management platform 202 groups deliveries of the delivery schedule 402 into loads, such as the loads 404a-c. In addition to including one or more deliveries, each load can include other information, such as a load identifier, pickup locations of the deliveries of the load, a drop-off location of the deliveries of the load, any other information related to the deliveries of the load, and any information related to the load more generally, such as notes regarding the load or regarding the carrier or deliverer that it is to be assigned to deliver the load. To group deliveries into loads, the delivery management platform 202 can apply an algorithm to maximize efficiency. For example, the delivery management platform 202 can group deliveries that have the same drop-off location and have geographically proximate pickup locations into a load. In some embodiments, the deliveries of a load can have the same mixing center as a drop-off location, but have different stores as a pickup location. As another example, the delivery management platform 202 can group deliveries into a load based on the pickup and drop-off times of the deliveries. As another example, the delivery management platform 202 can group deliveries into loads based on agreements made with carriers. Moreover, the delivery management platform 202 can account for deliveries that have special characteristics, such as being especially heavy or having numerous items. Having converted the delivery schedule into loads, the delivery management platform 202 can, as is further explained below in connection with FIGS. 6-7, make the loads available to carriers, who can accept the loads and perform the deliveries.

FIG. 5 illustrates example monitoring data 500. The monitoring data 500 can include information about loads, such as the loads created by the delivery management platform 200, as described above in connection with FIG. 4. The monitoring data 500 is displayable via a user interface to a user. The monitoring data 500 can include loads, and each load can have a load ID. Each load can be assigned to a carrier, as is further explained below, or a load can be unassigned, indicating that it has not been assigned to a carrier. The status of a load indicates, for example, whether the deliveries of the load are complete, whether the deliveries are in progress, whether there is a delay, whether a deliverer has not yet started to perform the deliveries of the load, and any other status information related to the load. The scheduled first pickup data can indicate a date and time of the first scheduled delivery of the load, and it can also indicate the location. The actual first pickup can indicate the actual time that the first scheduled delivery was picked up. The scheduled drop-off time can indicate the date or time that the deliveries are scheduled to be dropped off at a mixing center, or the scheduled drop-off time can indicate when the delivery of the load with the latest drop-off time is scheduled to be dropped off. The actual drop-off time indicates the actual date and time that all the deliveries of the load are dropped off. The monitoring data 500 can further include other data related to the load. For example, the monitoring data 500 can include notes for the load that relate to the performance of the deliveries of the load or to management of the load, and the monitoring data 500 can include information related to verification and payment.

By using the monitoring data 500, a user can track, in real time, the loads and the deliveries of the loads. The monitoring data 500 can be viewed, in some embodiments, by an operator at the workstation 206, a user of a mobile device of the mobile devices 204a-x, or the third-party carrier 216. Additionally, a user can select a load of the loads displayed in the monitoring data 500 to view more detailed information about the load. The monitoring data 500 can be generated by the delivery management platform 202 and stored in a database of the delivery management platform 202, or in a database communicatively coupled with the delivery management platform 202. In some embodiments, after converting a delivery schedule into loads, the delivery management platform 202 can update the monitoring data 500 with data for new loads. In some embodiments, the delivery management platform 202 can update the monitoring data 500 after assigning a load to a carrier or after receiving an event from a mobile device or from a third-party carrier. Furthermore, the delivery management platform 202 can create or edit the monitoring data based on an event log, which is further described below in connection with FIGS. 6-7.

Figure 6:
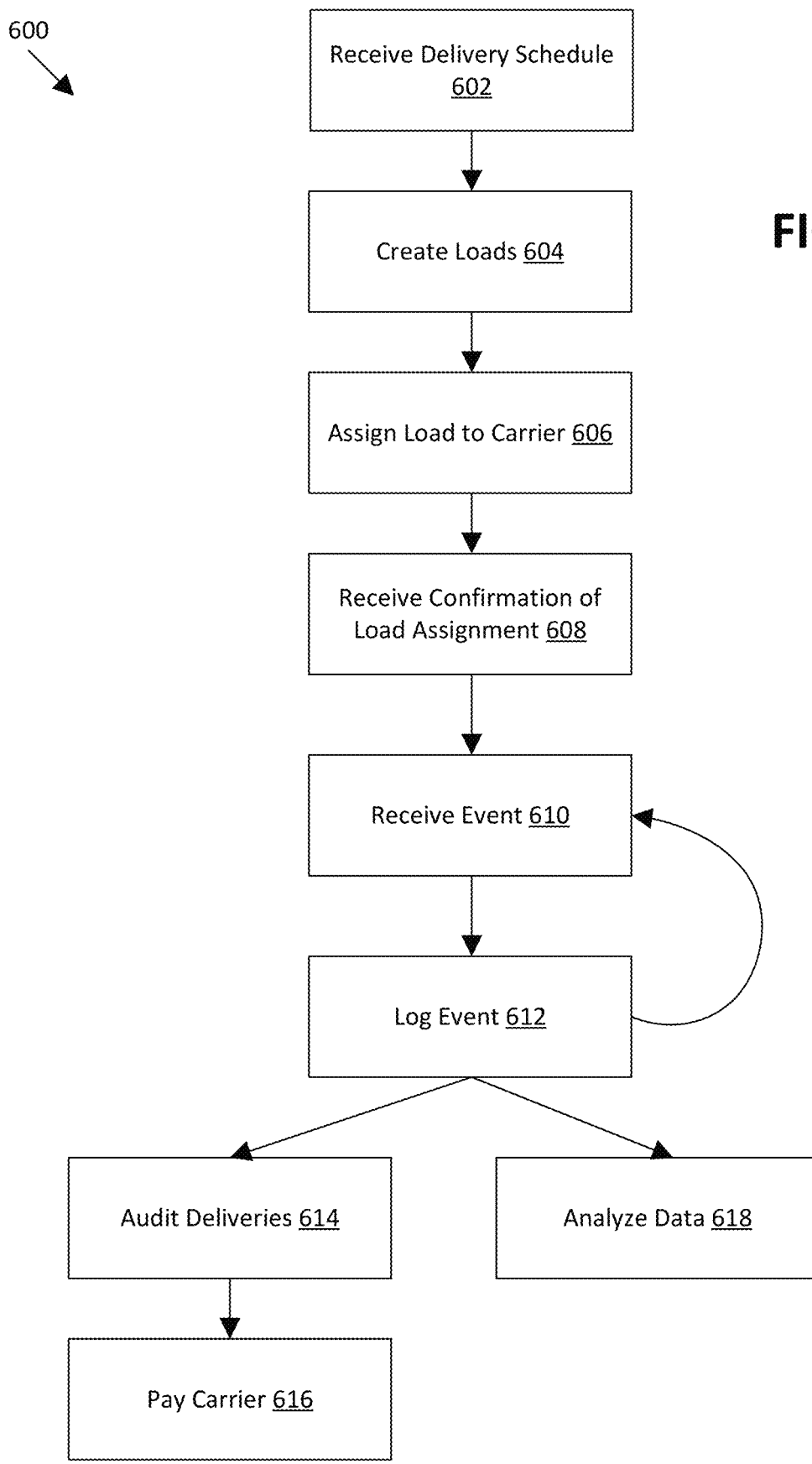
FIG. 6 is a flowchart of an example method useable by a delivery management platform.

FIG. 6 is a flowchart of a method 600. The method 600 is useable by the delivery management platform 202 to manage deliveries.

In the example shown, the method 600 is instantiated by receiving a delivery schedule (step 602). An example delivery schedule is illustrated in and described in connection with FIG. 4. The delivery management platform 202 can receive the delivery schedule from the workstation 206 or from a different source. In some embodiments, the delivery management platform 202 can generate the delivery schedule. The delivery schedule can be based on product orders. Deliveries in the delivery schedule can correspond to deliveries of products from stores to mixing centers.

In the example shown, the delivery management platform 202 can create loads (step 604). To do so, the delivery management platform 202 can group deliveries of the delivery schedule (received, e.g., at step 602) into loads, as described in connection with FIG. 4.

In the example shown, the delivery management platform 202 can assign a load to a carrier (step 606). For example, the delivery management platform 202 can select one of the loads created from the delivery schedule (e.g., at step 604) and select a carrier. After selecting a carrier, the delivery management platform 202 can, for example, make the load available to a dispatcher of the carrier and send a notification to the mobile device corresponding to the dispatcher of that carrier. In selecting which carrier to assign a load to, the delivery management platform 202 can, in some embodiments, use an algorithm to select a carrier that can efficiently perform the deliveries of the load and that has the capacity to perform the deliveries. In other embodiments, the delivery management platform 202 can select a carrier that is assigned to the pickup or drop-off locations of the deliveries of the load. For example, if the carrier has a contract to perform the deliveries from a group of stores to a mixing center, and the deliveries of the load include such deliveries, the delivery management platform 202 can select that carrier.

In the example shown, the delivery management platform 202 can receive confirmation that a load has been assigned (step 608). For example, after making a load available to a carrier (at, e.g., step 606), the delivery management platform 202 can receive confirmation that a dispatcher of the carrier has accepted the load. The confirmation can be automatically sent from the mobile device of the dispatcher to the delivery management platform 202. The confirmation can be an event, which are further described below. Furthermore, as described below in connection with FIGS. 10A-10B, a dispatcher of a carrier can further assign the load to a deliverer of the carrier. The deliverer can then perform the deliveries of the load. After assigning the load to the deliverer, the mobile device of the dispatcher or the mobile device of the deliverer can automatically send an event to the delivery management platform 202 indicating that the load is assigned to a deliverer.

In the example shown, the delivery management platform 202 can receive an event (step 610). For example, the delivery management platform 202 can receive an event from a mobile device of the mobile devices 204a-x. Anything related to the load (assigned, e.g., at 606) can be an event. For example, the event can indicate that a dispatcher assigned a deliverer to the load, that the deliverer has started to perform the load, that a deliverer has arrived at a pickup location or a drop-off location, that a deliverer has completed the load, that the load is delayed, that the load is canceled, or that the load has been reassigned.

In the example shown, the delivery management platform 202 can log an event (step 612). For example, the delivery management platform 202 can record an event received from a mobile device (e.g., at step 610) in a log, which can be stored in a database of the delivery management platform 202, or in a database communicatively coupled with the delivery management platform 202. The recording in the log can include details of the event, the mobile device that sent the event, the date, the time, and any other information related to the event. The log can be used, for example, to edit the data in the carrier data 300 and the data in the monitoring data 500. After logging the event, the delivery management platform can receive another event, thereby returning to step 610.

In the example shown, the delivery management platform 202 can audit deliveries (step 614). For example, in response to receiving an event indicating that a load has been completed or indicating that payment is requested (at, e.g., step 610), the delivery management platform 202 can use the verification system 208 to confirm that the deliveries of the load have been performed. After verifying that the load has been completed, the delivery management platform 202 can pay the carrier that performed the load (step 616). For example, the delivery management platform 202 can use the payment system 210 to pay the carrier, as described above.

In the example shown, the delivery management platform 202 can analyze data (step 618). For example, the delivery management platform 202 can send at least a portion of the log (used in, e.g., step 612) to the workstation 206 or to a mobile device of the mobile devices 204a-x. The log can then be analyzed to determine, among other things, statuses of loads, performance of carriers, performance of deliverers, a payment status, inventory, or any other data related to the loads, deliveries, carriers, carrier members, or the mobile application.

Although specific method steps are shown, the method 600 is not limited to the steps 602-618. For example, the method 600 can have more or less steps than those shown, and the ordering is not limited to the ordering illustrated in FIG. 6.

Figure 7:
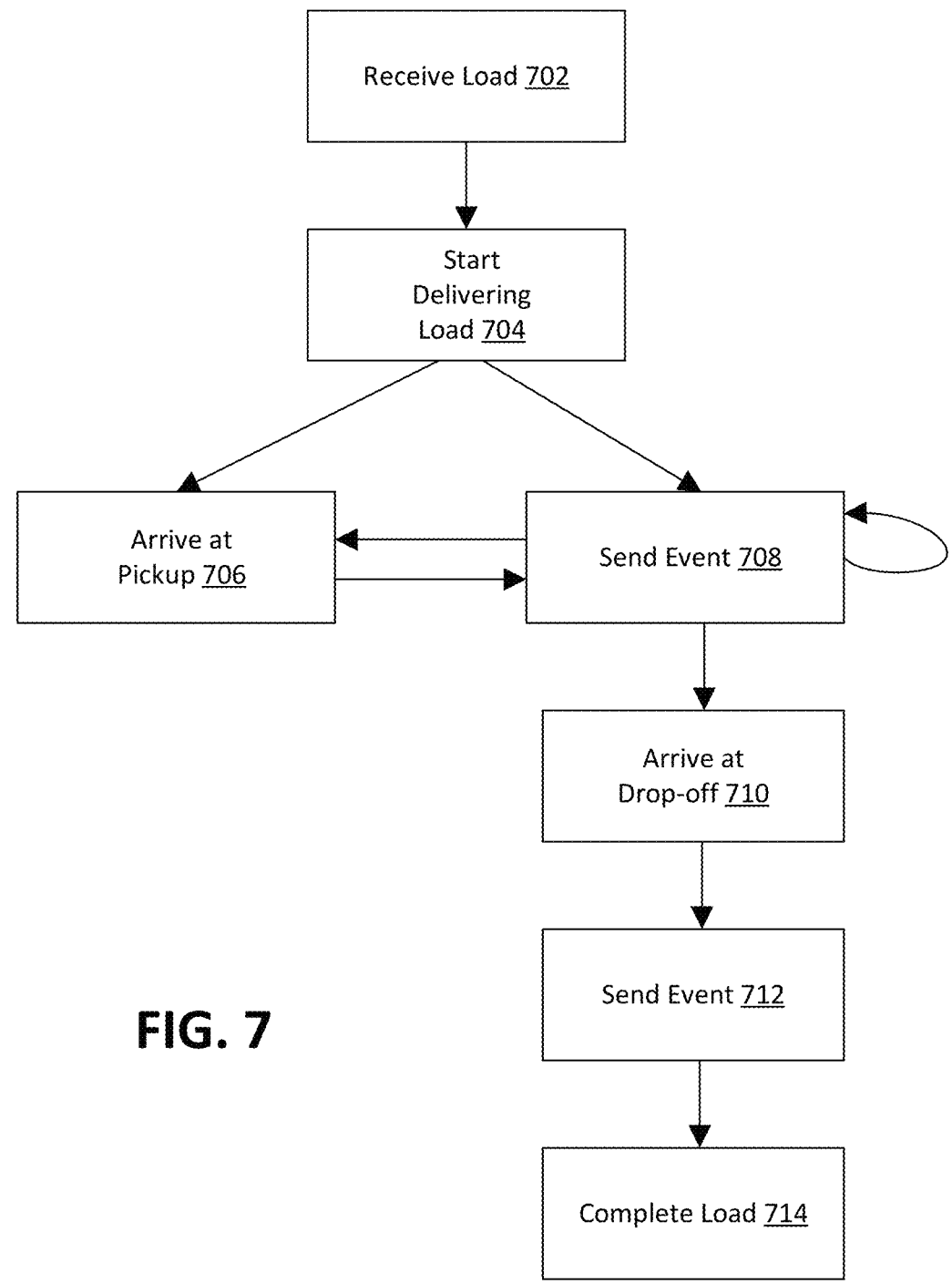
FIG. 7 is a flowchart of an example method useable by a user of a mobile application.

FIG. 7 is a flowchart of a method 700. The method 700 can be performed by a user of a mobile device of the mobile devices 204a-x. As briefly described above, the mobile device can execute a mobile application so that the user can perform the method 700. The user performing the method 700 can be a deliverer of a carrier. Although the example of FIG. 7 relates to a deliverer of a carrier using the mobile application, a deliverer of a third-party carrier can also perform a method similar to the method 700.

In some examples, the method 700 is instantiated by receiving a load (step 702). In some embodiments, a dispatcher of a carrier can assign, using the mobile application, the load to the deliverer. The deliverer can then receive the load via the mobile application. In some embodiments, the deliverer can assign the load to himself or to herself.

In some examples, the deliverer can start to perform the load (step 704). For example, the deliverer can select a load, via a user interface presented by the mobile application, and select to begin delivery of the load. In some examples, once delivery has started, the mobile application can display a user interface showing, for example, pickup and drop-off locations of the deliveries of the loads and other information related to the load.

In some examples, the deliverer can arrive at a pickup (step 706). For example, the deliverer can arrive at a pickup location of a delivery of the load. Having arrived at the pickup location, the deliverer can send an event to the delivery management platform 202 (step 708). The event can indicate that the deliverer has arrived at the pickup location. In some embodiments, the pickup location can be a store. In some embodiments, the mobile application can automatically detect that the deliverer has arrived at the store based on data from a tracking device of the mobile device, such as a GPS device. In some embodiments, the deliverer can manually send the event via an input field of a user interface of the mobile application.

In some examples, the deliverer can send an event to the delivery management platform 202 without first arriving at a pickup location (step 708). For example, if, after starting a delivery, the deliverer experiences a delay, the mobile application shuts down, or the load is reassigned, then an event indicating what happened can be sent to the delivery management platform 202. An event can be sent based on manual input of the deliverer via a user interface of the mobile application, or the event can be sent automatically by the mobile application. The deliverer can continue to send events (e.g., repeating step 708). For example, a deliverer may experience a delay, thereby causing an event, followed by a resolution of the delay and subsequent continuation of the deliveries, thereby causing another event.

In some examples, after sending an event (e.g., at step 708), the deliverer can arrive at a pickup location (step 706). If the load includes a plurality of deliveries, then the pickup location can be different than a previous pickup location. After arriving at the pickup location, the deliverer can send another event, thereby returning to step 708.

In some examples, the deliverer can arrive at a drop-off location (step 710). For example, the deliverer can arrive at a mixing center to drop off the deliveries of the load. After arriving at the drop-off location, the deliverer can send an event (step 712). The event can indicate that the deliverer has arrived at the drop-off location. In some embodiments, the mobile application can automatically send the event by detecting, based on data from a GPS device of the mobile device, that the deliverer is at the drop-off location. In some embodiments, the deliverer can manually send the event via an input field of a user interface of the mobile application.

In some examples, the deliverer can complete the load (step 714). For example, after products have been unloaded at the drop-off location, the deliverer can send an event to the delivery management platform 202 indicating that the load has been completed. In some embodiments, the deliverer can manually send the event via the mobile application by scanning the unloaded products or by entering data into an input field of a user interface of the mobile application.

Although specific method steps are shown, the method 700 is not limited to the steps 702-714. For example, the method 700 can have more or less steps than those shown, and the ordering is not limited to the ordering illustrated in FIG. 7.

Figure 8:
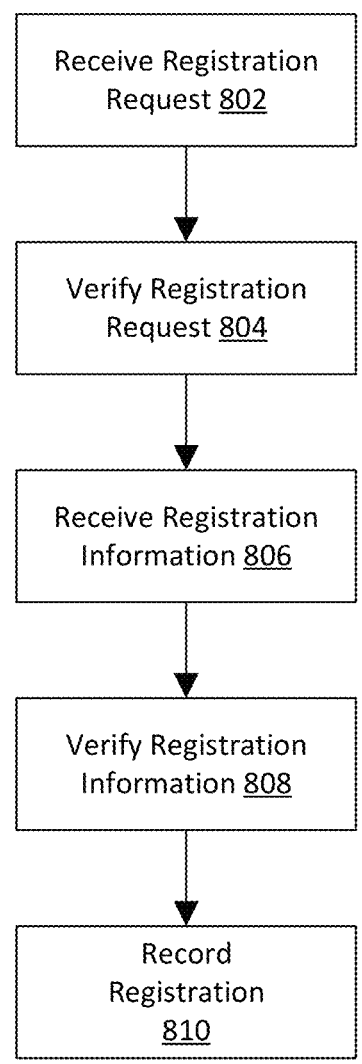
FIG. 8 is a flowchart of an example method for registering an entity.

FIG. 8 is a flowchart of a method 800. The method 800 can be used by the delivery management platform 202 to register a new entity. In some embodiments, the method 800 can be used by the registration system 212 to register a new entity. The method 800 can be used, for example, to register a new carrier, a new dispatcher, or a new deliverer.

In the example shown, the method 800 is instantiated by receiving a registration request (step 802). For example, a mobile device can download and run the mobile application, which can, in some embodiments, display a user interface comprising user input fields for creating a registration request. In some examples, a third-party carrier can create and send a registration request. The registration request, which can be sent via the mobile application to the delivery management platform 202, can include, among other things, a registration identification number, a name, a position, a mobile phone number, an email address, and data indicating whether the carrier is a third-party carrier.

In some examples, the delivery management platform 202 can verify the registration request (step 804). For example, the delivery management platform 202 can send the registration request to the registration system 212. The registration system 212 can then verify, for example, that the registration request includes all the required information and that there are no errors. In some embodiments, the registration system 212 can verify that the registration has already been approved by an entity that owns and operates the delivery management platform 202.

In some examples, the delivery management platform 202 can receive registration information (step 806). For example, after receiving a verification that a registration request is valid (at, e.g., step 804), the delivery management platform 202 can receive additional information from the mobile device, such as information related to an account on the mobile application, including a username, a password, payment information, information related to mobile device application permissions, and any other information required to set up an account of the mobile application and to register with the mobile application platform 202.

In some examples, the delivery management platform 202 can verify the registration information (step 808). For example, the delivery management platform 202 can send the registration information (received, e.g., at step 804 and 806) to the registration system 212. The registration system 212 can verify that the information suffices to create an account on the mobile application.

In some examples, the delivery management platform 202 can record the registration (step 810). For example, after verifying that the user has provided the information required to create an account, the delivery management platform 202 can record, for example in the carrier data 300, the registration and information related to the registration.

Although specific method steps are shown, the method 800 is not limited to the steps 802-810. For example, the method 800 can have more or less steps than those shown, and the ordering is not limited to the ordering illustrated in FIG. 8. Additionally, as mentioned above, in some embodiments, the method 800 can be performed by the registration system 212 without the delivery management platform 202. For example, a registering mobile device can directly interface with the delivery management platform 202, and upon successful registration, the mobile device can connect with the delivery management platform 202.

Referring generally to FIGS. 9-14, a plurality of mobile devices and user interfaces are illustrated. The mobile devices can be mobile devices of the mobile devices 204a-x. The mobile devices shown in FIGS. 9-14 can be operatively coupled with the delivery management platform 202, and they can execute the mobile application described herein. The screens of the mobile devices shown in FIGS. 9-14 can be touchscreens.

The organization, display, and content of the user interfaces can be different in certain embodiments than the organization, display, and content shown in and described in connection with the user interfaces of FIGS. 9-14. Furthermore, the mobile application can include more or less user interfaces than the user interfaces described in connection with FIGS. 9-14. For example, the mobile application can include a settings user interface, a registration user interface, a login user interface, a user information user interface, a contacts user interface, a report error user interface, or a help user interface.

Figure 9:
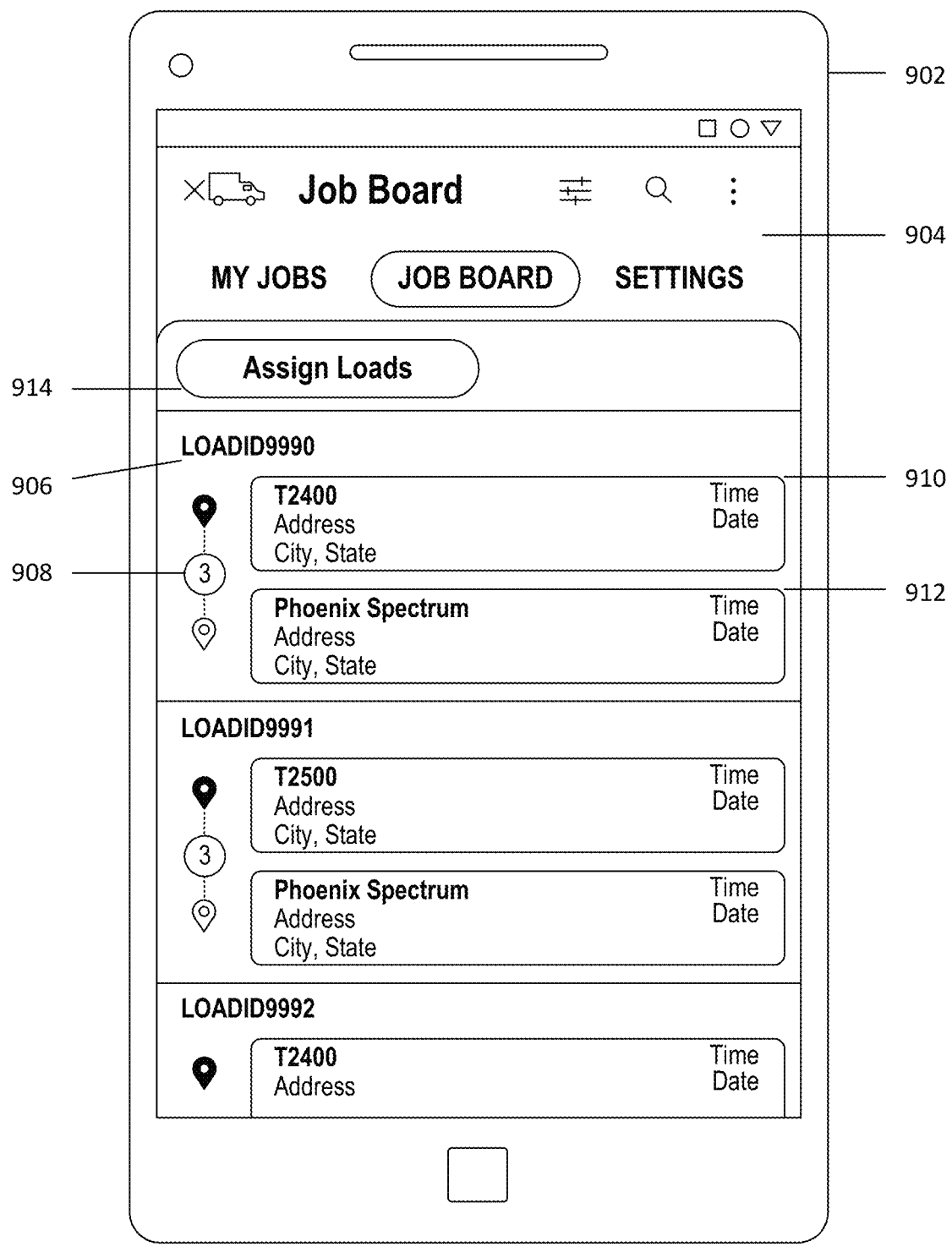
FIG. 9 illustrates an available loads user interface of the mobile application.

FIG. 9 illustrates a mobile device 902. The mobile device 902 comprises a screen displaying an available loads user interface 904. The available loads user interface 904 comprises a plurality of available loads, including, for example, the available load 906. Each available load can comprise information related to the load. For example, the available load 906 can comprise a load identifier, a first pickup location 910, a drop-off location 912, and a stops indicator 908. The stops indicator can indicate, for example, the number of stops required to complete the load or the number of deliveries that the load comprises. The available loads user interface 904 further comprises an assign loads button 914.

The available loads user interface 904 can be displayed, for example, to a dispatcher of a carrier. For example, as described above, the delivery management platform 202 can select a carrier to perform a load and can make the load available to the dispatcher of the carrier. In some embodiments, the dispatcher can view the loads that are available to the carrier via the available loads user interface 904. Furthermore, the dispatcher can, by selecting the assign loads button 914 for example, assign one or more of the loads shown in the available loads user interface 904 to a deliverer of the carrier. In some embodiments, when the delivery management platform 202 makes a load available to a carrier, a deliverer can use the available loads user interface 904 to see the available loads and to assign to himself or to herself one or more available and unassigned loads.

Figure 10A:
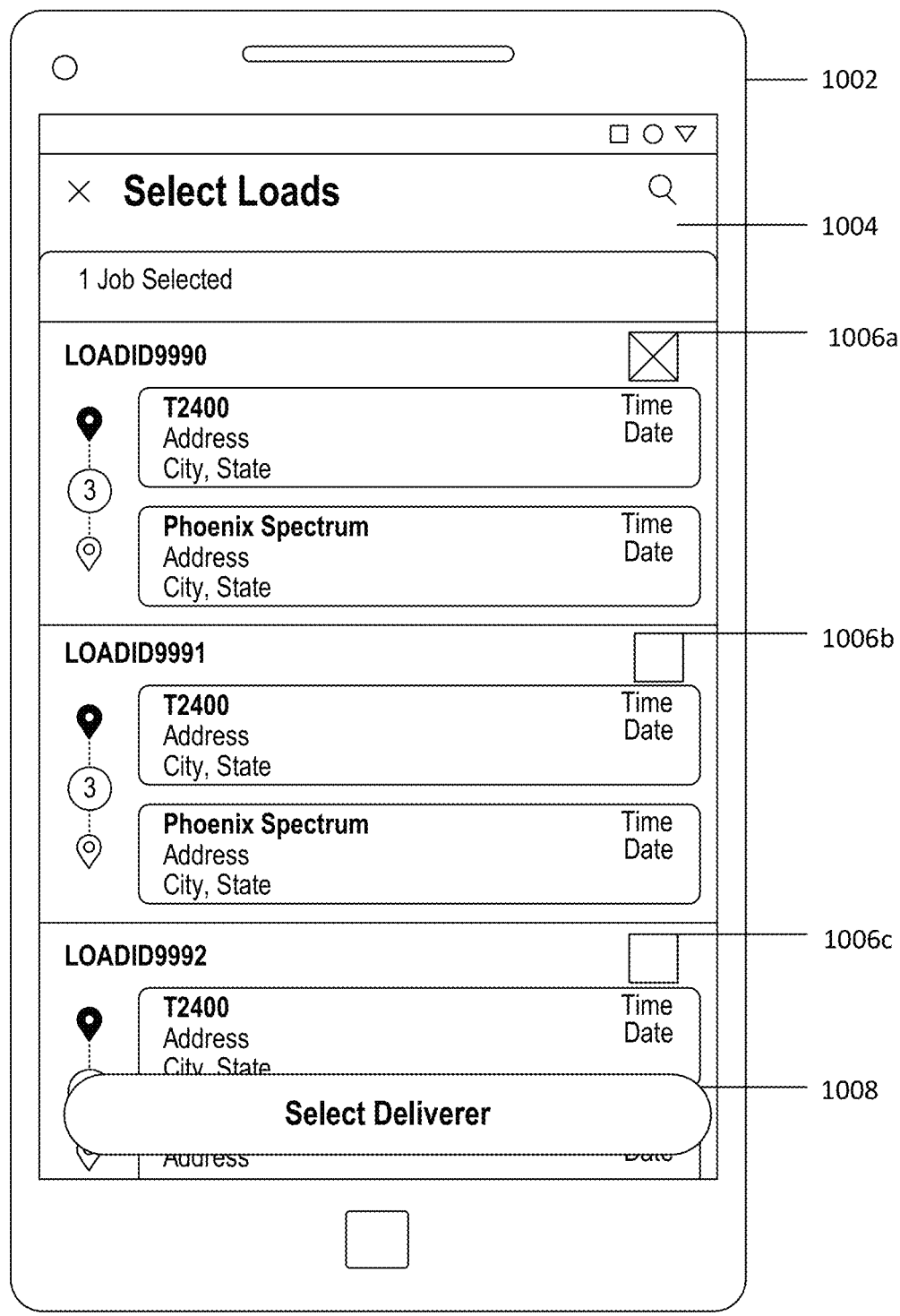
FIG. 10A illustrates a select loads user interface of the mobile application.
Figure 10B:
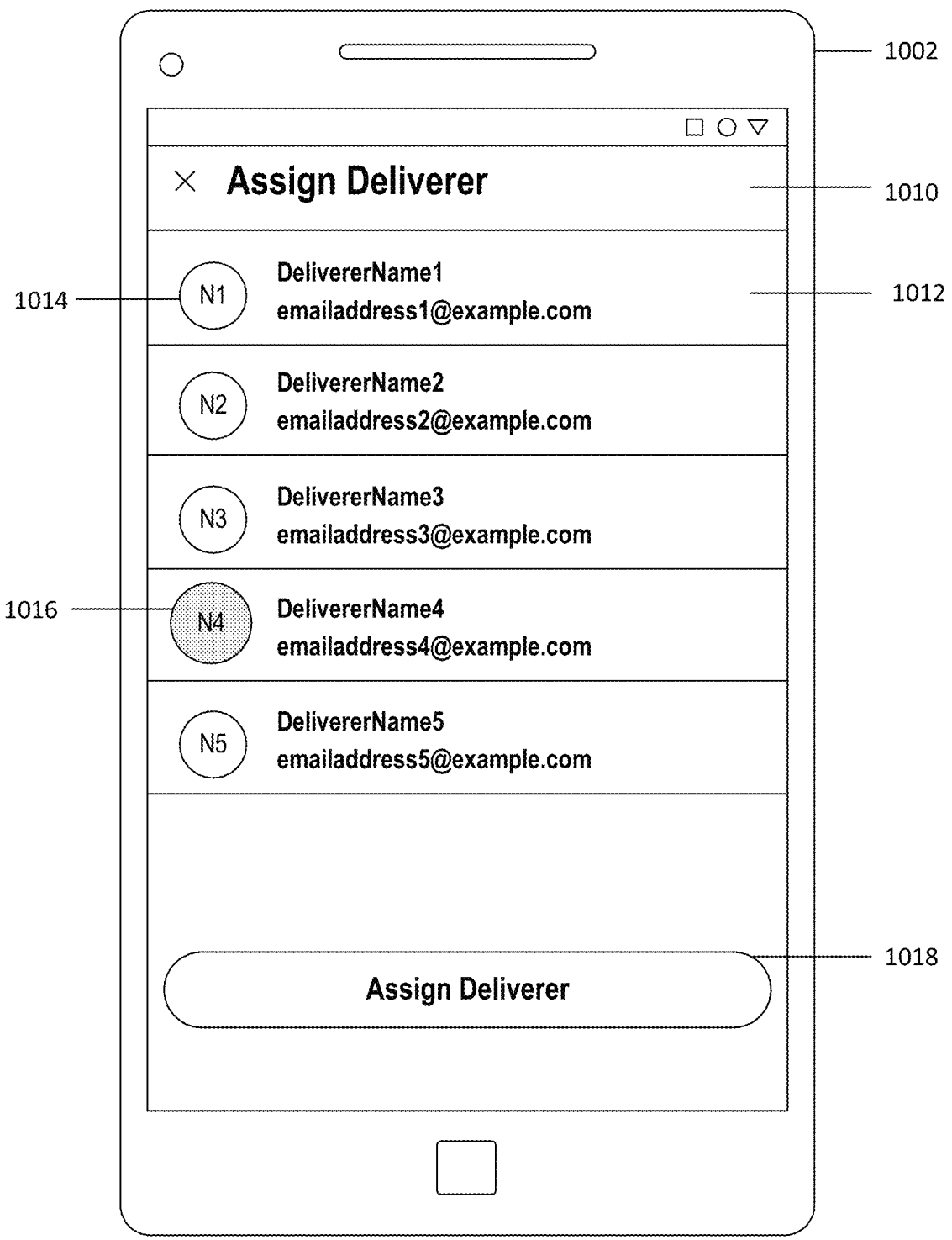
FIG. 10B illustrates an assign deliverer user interface of the mobile application.

FIGS. 10A-10B illustrate a mobile device 1002 displaying user interfaces useable to assign loads to deliverers. In some embodiments, a dispatcher of a carrier can use the user interfaces shown in FIGS. 10A-10B after selecting the assign jobs button 914 of FIG. 9. In some embodiments, a deliverer of a carrier can similarly use the interfaces shown in FIGS. 10A-10B.

In FIG. 10A, the screen of the mobile device 1002 displays a select loads user interface 1004. The select loads user interface 1004 comprises one or more loads. The loads can be available and unassigned loads, or they can be loads that are assigned but that can be reassigned. Each load displayed in the select loads user interface 1004 comprises a selection field, such as selection fields 1006a-c. In some embodiments, a dispatcher of a carrier can use the selection fields to select loads for assignment to a deliverer. Having selected one or more loads, as exemplified by the X in the selection field 1006a, the dispatcher can select the select deliverer button 1008, which, when selected can, in certain embodiments, cause the assign deliverer user interface 1010 of FIG. 10B to be displayed.

FIG. 10B illustrates the assign deliverer user interface 1010. The assign deliverer user interface 1010 can comprise one or more deliverers, such as the deliverer 1012. For each deliverer, information can be displayed, such as the deliverer's name, email address, phone number, availability, and vehicle type. Furthermore, for each deliverer, there can be a deliverer selection field, such as the deliverer selection field 1014. In some embodiments, the dispatcher of a carrier can assign one or more loads, which are selected, for example, in the select loads user interface 1004, to a deliverer of the assign deliverer user interface 1010. The dispatcher can select a deliverer selection field. By selecting a deliverer selection field, the deliverer selection field can indicate that a deliverer has been selected. For example, the gray deliverer selection field 1016 indicates that DelivererName4 has been selected. After selecting a deliverer selection field, the dispatcher can select the assign deliverer button 1018 to assign the selected one or more loads of the selected user interface 1004 to the selected deliverer of the assign deliverer user interface 1010. In some embodiments, the mobile application can then automatically send an event to the delivery management platform 202 indicating that the one or more loads have been assigned to a deliverer. Furthermore, the mobile device of the selected deliverer can receive, via the mobile application, a notification that it is assigned the one or more loads.

Figure 11:
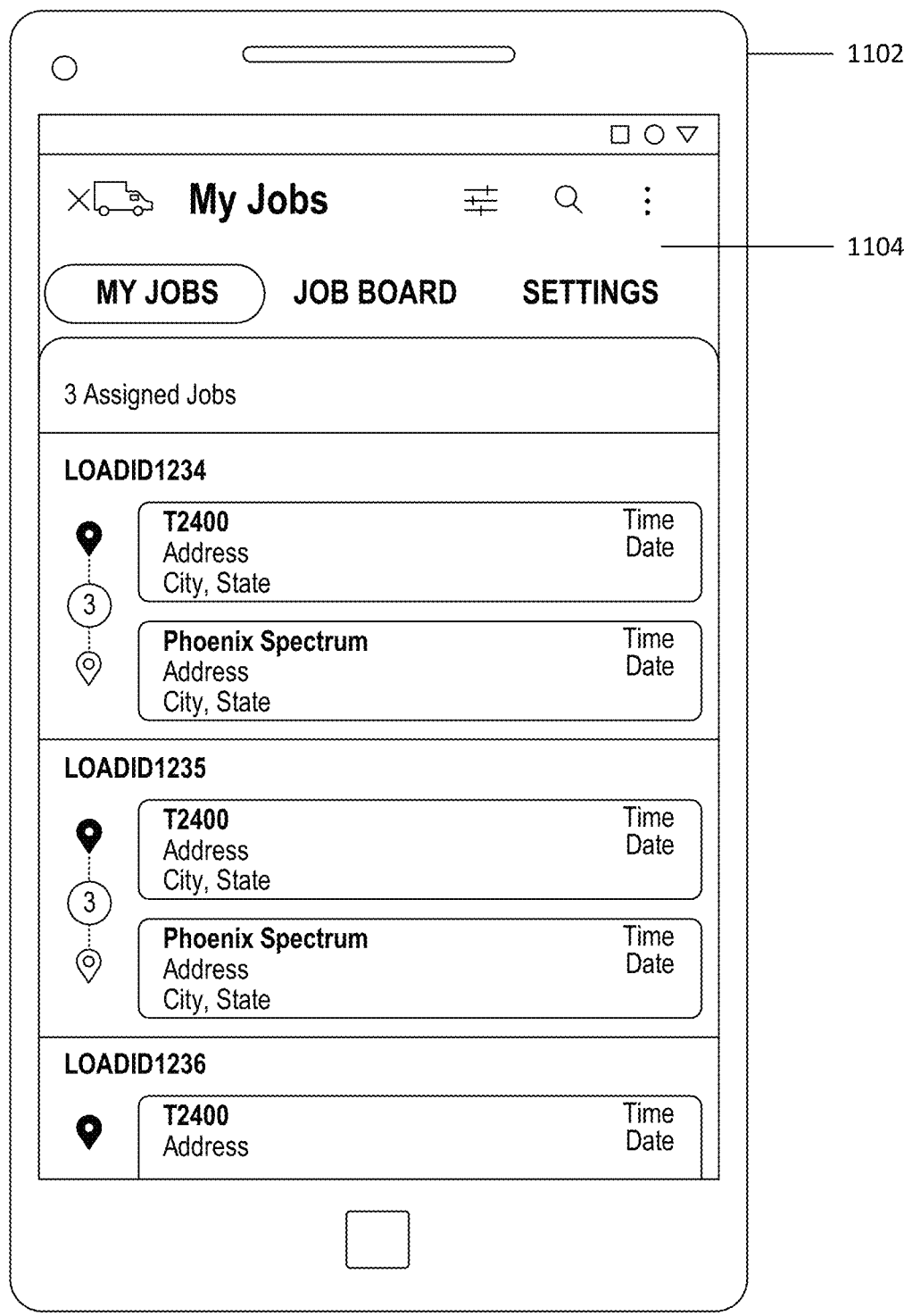
FIG. 11 illustrates an assigned loads user interface of the mobile application.

FIG. 11 illustrates a mobile device 1502 displaying an assigned loads user interface 1504. The assigned loads user interface 1504 can be displayed, for example, to a deliverer of a carrier. The assigned loads user interface 1504 can also be displayed to a dispatcher of a carrier to, for example, view the loads of a deliverer. The assigned loads user interface 1504 can comprise loads that are assigned to a deliver. For example, after a load has been assigned to a deliverer, as described above, the load can be included in the loads displayed in the assigned loads user interface 1504. Each load displayed in the assigned loads user interface 1504 can include information related to the load, such as an identifier, a number of stops required to perform the deliveries of the load, a pickup location, a drop-off location, a date, a time, an estimated inventory size, an estimated delivery time, and other information related to the load or deliveries of the load. To start to perform a load, a deliver can, in some embodiments, select a load of the loads displayed in the assigned loads user interface 1504.

Figure 12:
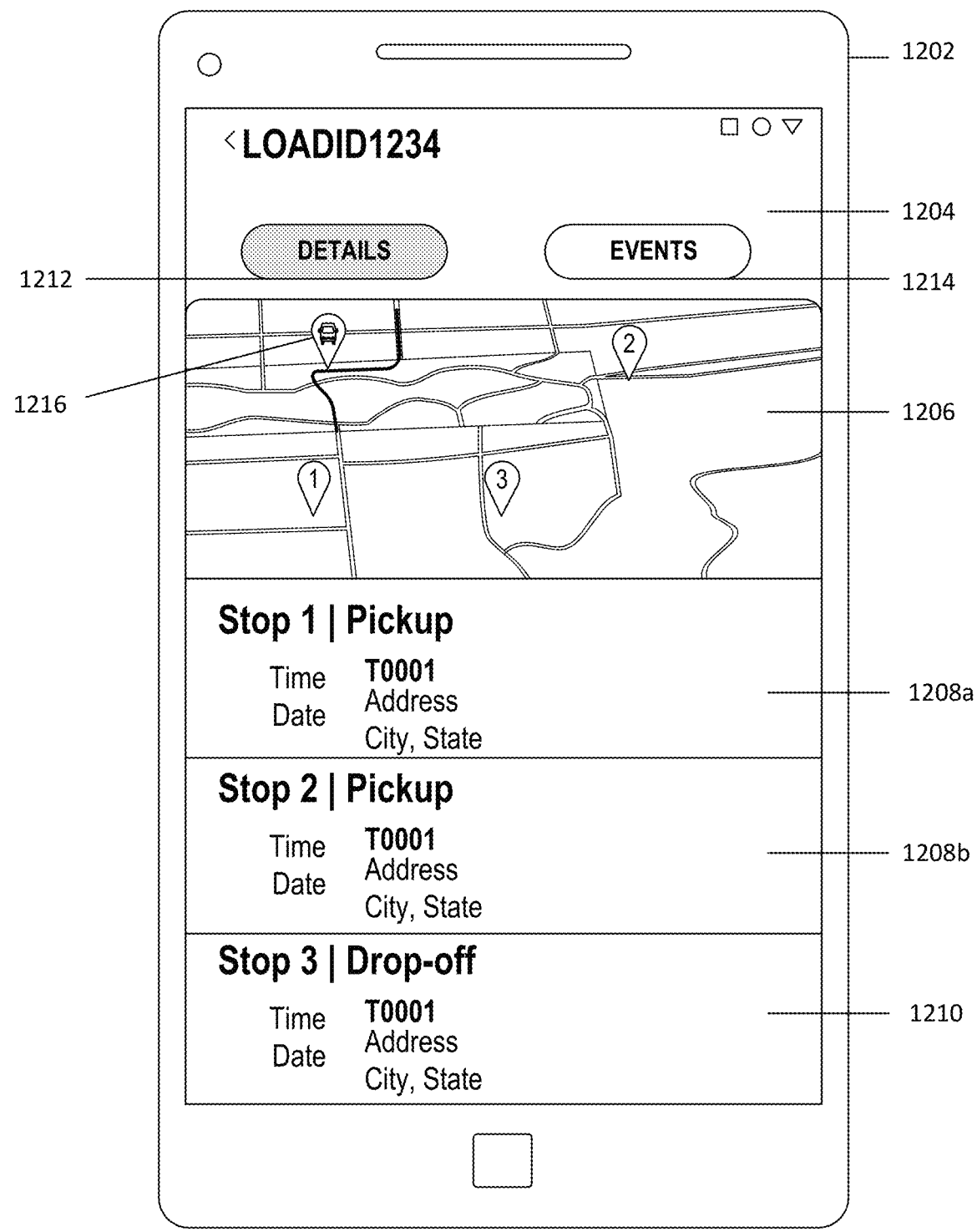
FIG. 12 illustrates an active load user interface of the mobile application.
Figure 13:
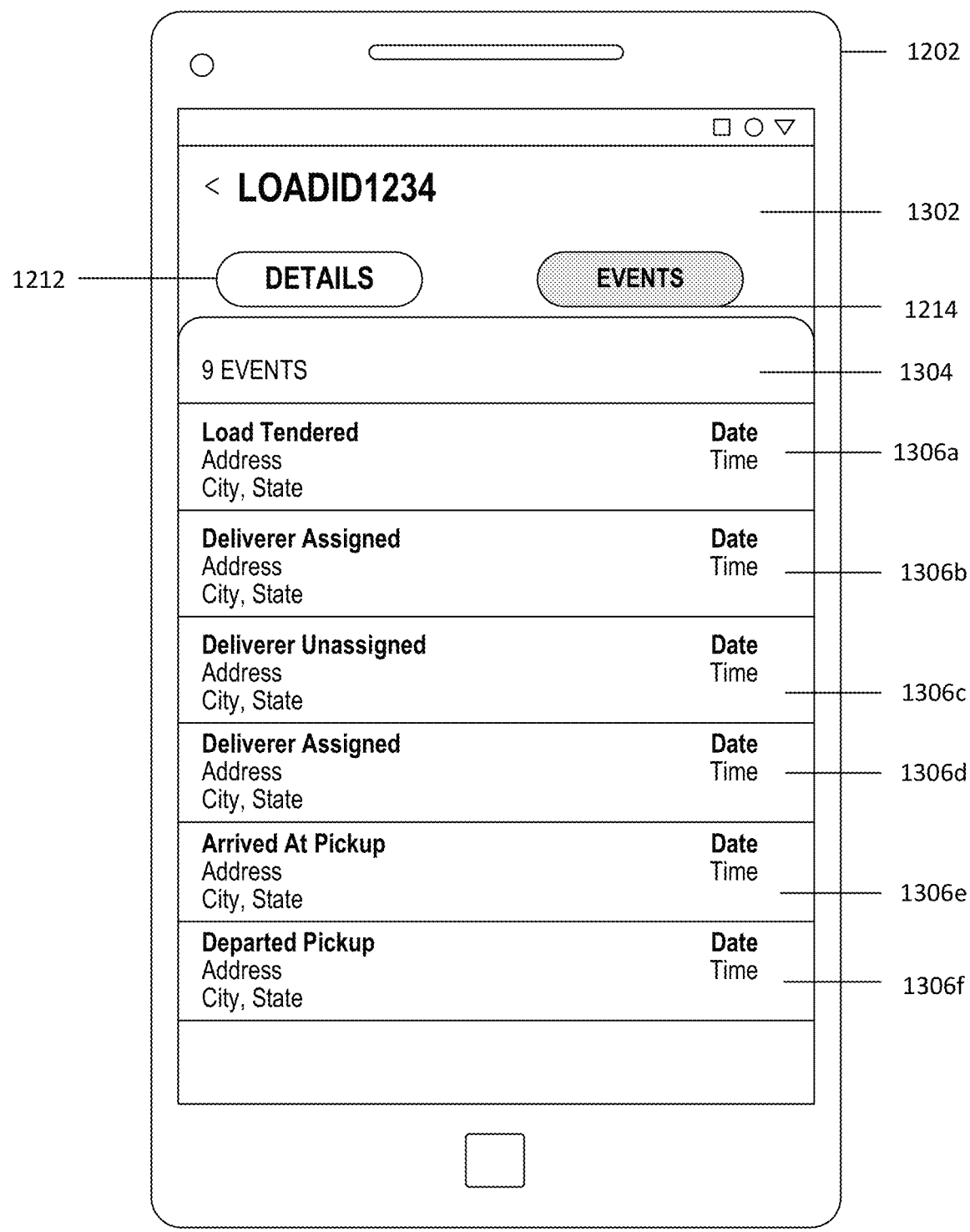
FIG. 13 illustrates an events user interface of the mobile application.

FIGS. 12-13 illustrate a mobile device 1202 displaying user interfaces related to performing deliveries of a load. In the examples of FIGS. 12-13, the load has an identification number of "1234." The user interfaces shown in FIGS. 12-13 can be used by a deliverer performing the load, a dispatcher monitoring the load or monitoring the deliverer, or another entity monitoring the load or the deliverer, such as a user of the workstation 206.

FIG. 12 illustrates an active load user interface 1204. The active load user interface comprises a map 1206, pickup locations 1208*a-b*, a drop-off location 1210, a details button 1212, and an events button 1214. In some embodiments, the map 1206 can include a location of the deliverer 1216, as illustrated in the example of FIG. 12 by a car icon. The location of the deliverer 1216 can be determined based on data from a GPS device of the mobile device used by the deliverer. The map 1206 can further include one or more pickup locations of deliveries of a load and one or more drop-off locations of deliveries of the load. The one or more pickup locations can, for example, correspond to the pickup locations 1208*a-b*. The one or more drop-off locations can, for example, correspond to the drop-off location 1210 and other possible stops included in the active load user interface 1204. As described above, in some embodiments, the pickup locations 1208*a-b* can be retail stores and the drop-off location 1210 can be a mixing center.

FIG. 13 illustrates an events user interface 1302. The events user interface 1302 can comprise an events list 1304 comprising one or more events 1306*a-f*. The events 1306*a-f* can relate to a load. In some embodiments, the events user interface 1302 can be displayed on the same user interface as the active load user interface 1204. As described above, the mobile application can send events related to a load to the delivery management platform 202, and these events can also be displayed in the events user interface 1302. In some embodiments, an event of the events 1306*a-f* can be selected to view details regarding the event, as illustrated in FIG. 14.

Figure 14:
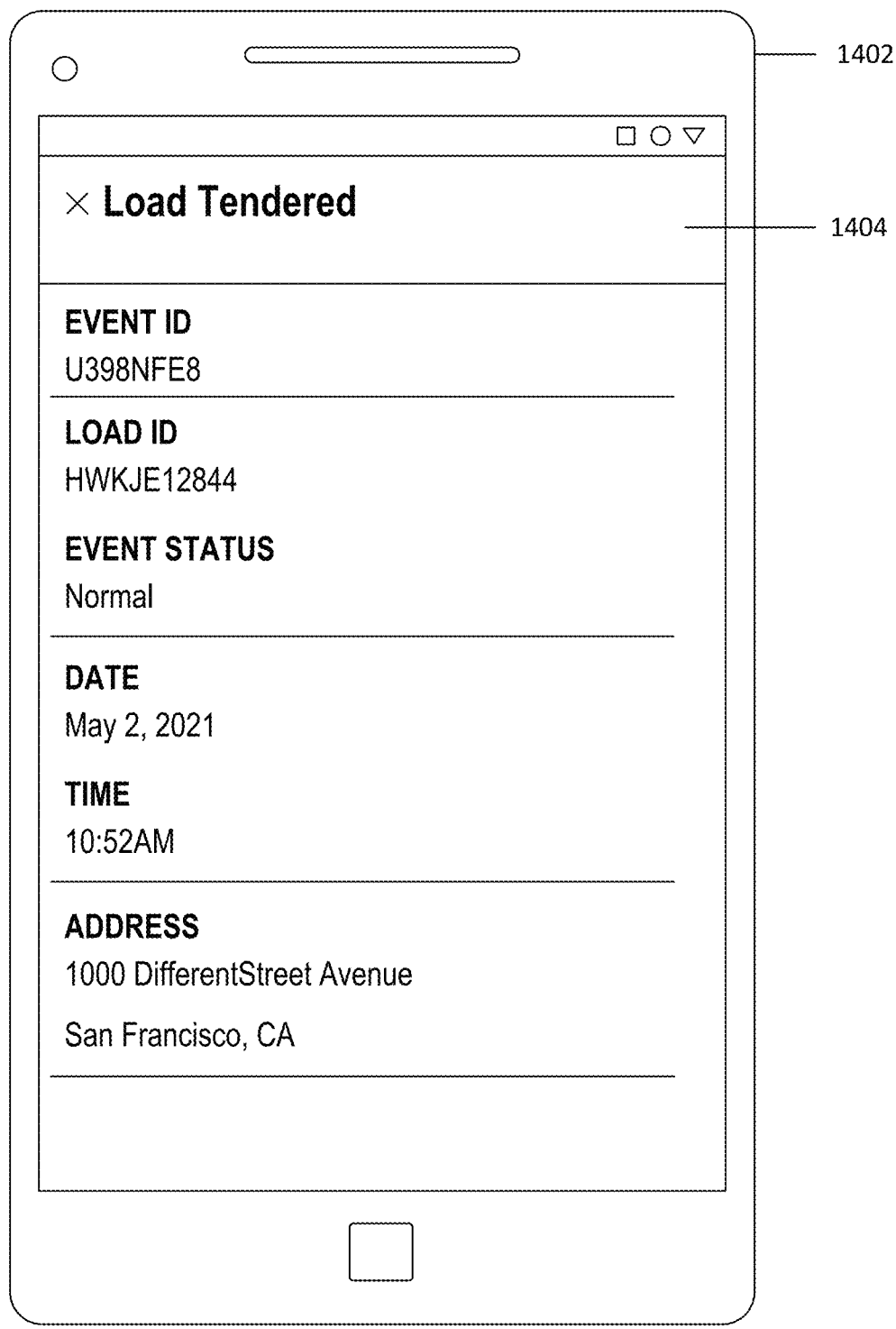
FIG. 14 illustrates an event details user interface of the mobile application.

FIG. 14 illustrates a mobile device 1402 displaying an event details user interface 1404. The event details user interface 1404 can be displayed, for example, in response to a user selecting the event 1306*a* of FIG. 13. The event details user interface 1404 comprises information related to a selected event. For example, the event details user interface 1404 can include an event title, an event identification, an identification of the load that the event relates to, an event status, a date, a time, an address, geographic coordinates, and any other information related to the event. In some embodiments, the event details user interface 1404 can be displayed to the deliverer performing the load, to the dispatcher of the carrier, or to another entity, such as a user of the workstation 206. When an event is sent by a mobile device to the delivery management platform 202, the mobile device can also send other information related to the event, such as the information shown in the event details user interface 1404.

Figure 15:
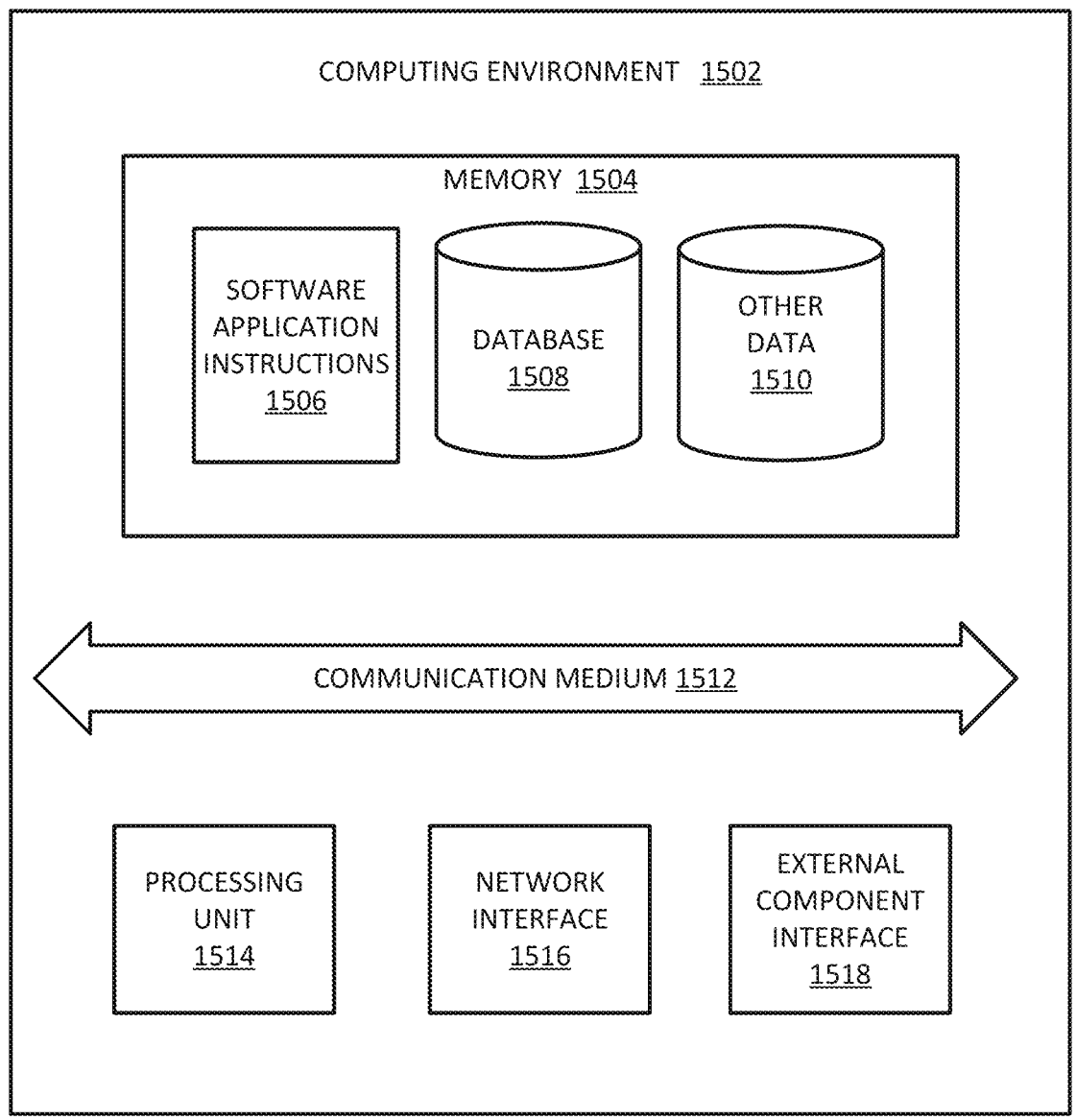
FIG. 15 illustrates an example block diagram of a computing system.

FIG. 15 illustrates an example system 1500 with which disclosed systems and methods can be used. In an example, the following can be implemented in one or more systems 1500 or in one or more systems having one or more components of system 1500: the delivery management platform 202, the mobile devices 204*a-x*, the workstation 206, the verification system 208, the payment system 210, the registration system 212, the mobile device 902, the mobile device 1002, the mobile device 1102, the mobile device 1202, the mobile device 1402, and any other computing systems disclosed herein.

In an example, the system 1500 can include a computing environment 1502. The computing environment 1502 can be a physical computing environment, a virtualized computing environment, or a combination thereof. The computing environment 1502 can include memory 1504, a communication medium 1512, one or more processing units 1514, a network interface 1516, and an external component interface 1518.

The memory 1504 can include a computer readable storage medium. The computer storage medium can be a device or article of manufacture that stores data and/or computer-executable instructions. The memory 1504 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1504 can store various types of data and software. For example, as illustrated, the memory 1504 includes software application instructions 1506, one or more databases 1508, as well as other data 1510.

The communication medium 1512 can facilitate communication among the components of the computing environment 1502. In an example, the communication medium 1512 can facilitate communication among the memory 1504, the one or more processing units 1514, the network interface 1516, and the external component interface 1518. The communications medium 1512 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1514 can include physical or virtual units that selectively execute software instructions, such as the software application instructions 1506. In an example, the one or more processing units 1514 can be physical products comprising one or more integrated circuits. The one or more processing units 1514 can be implemented as one or more processing cores. In another example, one or more processing units 1514 are implemented as one or more separate microprocessors. In yet another example embodiment, the one or more processing units 1514 can include an application-specific integrated circuit (ASIC) that provides specific functionality. In yet another example, the one or more processing units 1514 provide specific functionality by using an ASIC and by executing computer-executable instructions.

The network interface 1516 enables the computing environment 1502 to send and receive data from a communication network (e.g., the networks 214a-c). The network interface 1516 can be implemented as an Ethernet interface, a token-ring network interface, a fiber optic network interface, a wireless network interface (e.g., Wi-Fi), or another type of network interface.

The external component interface 1518 enables the computing environment 1502 to communicate with external devices. For example, the external component interface 1518 can be a USB interface, Thunderbolt interface, a Lightning interface, a serial port interface, a parallel port interface, a PS/2 interface, or another type of interface that enables the computing environment 1502 to communicate with external devices. In various embodiments, the external component interface 1518 enables the computing environment 1502 to communicate with various external components, such as external storage devices, input devices, speakers, modems, media player docks, other computing devices, scanners, digital cameras, and fingerprint readers.

Although illustrated as being components of a single computing environment 1502, the components of the computing environment 1502 can be spread across multiple computing environments 1502. For example, one or more of instructions or data stored on the memory 1504 may be stored partially or entirely in a separate computing environment 1500 that is accessed over a network.

Depending on the size and scale of the computing environment 1502, it may be advantageous to include one or more load balancers to balance traffic across multiple physical or virtual machine nodes.

Aspects of the platform 1500 and the computing environment 1502 can be protected using a robust security model. In an example, users may be made to sign into the system using a directory service. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full platform 1500, such that portal can run and schedule jobs and serve the portal user interface as long as a single node remains functional. The environment 1502 may include monitoring technology to determine when a node is not functioning so an appropriate action can be taken.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A delivery management platform comprising:
  a processing unit; and
  a memory coupled to the processing unit, the memory storing instructions that, when executed by the processing unit, cause the delivery management platform to:
    receive a delivery schedule comprising a plurality of deliveries, wherein each delivery of the plurality of deliveries comprises a pickup location owned by an entity and a drop-off location owned by the entity;
    convert the delivery schedule into a plurality of loads, wherein each load of the plurality of loads includes a group of deliveries of the plurality of deliveries;
    assign, using a mobile application provided by the entity, a first load of the plurality of loads to a first carrier organization; and
    assign, using the mobile application provided by the entity, a second load of the plurality of loads to a second carrier organization different from the first carrier organization;

wherein the first carrier organization includes a first plurality of members including one or more dispatchers and one or more deliverers;

wherein the second carrier organization includes a second plurality of members, each member of the second plurality of members being different from each member of the first plurality of members;

wherein assigning, using the mobile application, the first load of the plurality of loads to the first carrier organization comprises:

sending the first load to a first mobile device, wherein the first mobile device receives the first load by using a first installation instance of the mobile application;

wherein the instructions, when executed by the processor, further cause the delivery management platform to receive an event from a second mobile device, wherein the second mobile device automatically sends the event by using a second installation instance of the mobile application in response to determining, using a global position system (GPS) device of the second mobile device, that the second mobile device is located at a drop-off location of the first load; and wherein the instructions, when executed by the processor, further cause the delivery management platform to, in response to receiving the event, automatically push the event to the first mobile device, wherein automatically pushing the event to the first mobile device causes a graphical user interface of the first installation of the mobile application to display data corresponding to a load complete event and to the drop-off location of the first load.

2. The delivery management platform of claim 1, wherein the pickup location is a store owned by the entity; and wherein the drop-off location is a mixing center owned by the entity.

3. The delivery management platform of claim 2, wherein the pickup location of each delivery of the first load is a different store owned by the entity; and wherein the drop-off location of each delivery of the first load is a common mixing center owned by the entity.

4. The delivery management platform of claim 3 wherein the first load further comprises:

a load identifier; a date; a plurality of pickup times; a drop-off time; an assigned deliverer; and an assigned carrier.

5. The delivery management platform of claim 1, wherein a first user is a dispatcher of the first carrier organization;

wherein a second user is a deliverer of the first carrier organization; and wherein the delivery management platform assigns the first load to the second user in response to assignment of the first load by the first user via the first installation instance of the mobile application.

6. The delivery management platform of claim 5, wherein the first mobile device is a same device as the second mobile device.

7. The delivery management platform of claim 1, wherein the instructions, when executed, further cause the delivery management platform to:

receive, via the mobile application, a carrier registration request for the first carrier organization from a registering mobile device, wherein the registering mobile device sends the carrier registration request by using an installation instance of the mobile application;

in response to receiving the carrier registration request via the mobile application, register the first carrier organization in a database;

register a dispatcher of the first carrier organization in the database; and register a deliverer of the first carrier organization in the database.

8. The delivery management platform of claim 1, wherein the instructions, when executed, further cause the delivery management platform to:

receive a load complete event from at least one of the first mobile device or the second mobile device;

send a verification request to a verification system;

receive a load complete verification from the verification system, the load complete verification indicating that the delivery of the first load was performed.

9. The delivery management platform of claim 1, wherein the instructions, when executed, further cause the delivery management platform to:

initiate, from the delivery management platform, a payment to one or more of: a first user of the first mobile device, a second user of the second mobile device, or the first carrier organization.

10. The delivery management platform of claim 1, wherein the instructions, when executed, further cause the delivery management platform to:

record an event in an event log; and send the event of the event log to an analysis platform, wherein the analysis platform comprises a user interface displaying the event.

11. The delivery management platform of claim 1, wherein assigning, using the mobile application provided by the entity, the first load of the plurality of loads to the first carrier organization is performed without using a protocol or application of the first carrier organization.

12. The delivery management platform of claim 1, wherein the instructions, when executed by the processor, further cause the delivery management platform to:

receive a plurality of events from the second mobile device;

for each of the plurality of events, automatically update monitoring data for the first load; and for each of the plurality of events, provide a real-time update of the monitoring data to the first mobile device.

13. The delivery management platform of claim 12, wherein the plurality of events includes an arrived at pickup event automatically sent by the second installation instance of the mobile application in response to detecting that a location of the second mobile device is at a pickup location; and wherein the plurality of events includes a load complete event automatically sent by the second installation instance of the mobile application in response to receiving a manual input into the second mobile device.

14. The delivery management platform of claim 1, wherein the instructions, when executed by the processor, further cause the delivery management platform to, after receiving the event, automatically execute a verification system that processes an image to verify that the first load is delivered at the drop-off location of the first load.

15. The delivery management platform of claim 1, wherein the instructions, when executed by the processor, further cause the delivery management platform to:

after receiving the event, automatically execute a verification system to verify that the first load is delivered to the drop-off location based on data received from each of the drop-off location and the second mobile device; and in response to verifying that the first load is delivered to the drop-off location, automatically trigger a process at the drop-off location to sort items of the first load based on geographic proximity of subsequent destinations.

16. A delivery management system comprising:

a plurality of mobile devices having a mobile application installed thereon, the plurality of mobile devices including at least a first mobile device and a second mobile device; and a delivery management platform including a processing unit and a memory coupled to the processing unit, the memory storing instructions that, when executed by the processing unit, cause the delivery management platform to:

receive a delivery schedule comprising a plurality of deliveries, wherein each delivery of the plurality of deliveries comprises a pickup location owned by an entity and a drop-off location owned by the entity;

convert the delivery schedule into a plurality of loads, wherein each load of the plurality of loads includes a group of deliveries of the plurality of deliveries;

assign, using the mobile application, a first load of the plurality of loads to a first carrier organization; and assign, using the mobile application, a second load of the plurality of loads to a second carrier organization different from the first carrier organization;

wherein the first carrier organization includes a first plurality of members including one or more dispatchers and one or more deliverers;

wherein the second carrier organization includes a second plurality of members, each member of the second plurality of members being different from each member of the first plurality of members;

wherein assigning, using the mobile application, the first load of the plurality of loads to the first carrier organization comprises:

sending, via the mobile application, the first load to the first mobile device; and wherein the instructions, when executed by the processor, further cause the delivery management platform to receive, via the mobile application, an event from the second mobile device, wherein the second mobile device automatically sends the event by using a second installation instance of the mobile application in response to determining, using a global position system (GPS) device of the second mobile device, that the second mobile device is located at a drop-off location of the first load; and wherein the instructions, when executed by the processor, further cause the delivery management platform to, in response to receiving the event, automatically push the event to the first mobile device, wherein automatically pushing the event to the first mobile device causes a graphical user interface of a first installation instance of the mobile application to display data corresponding to a load complete event and to the drop-off location of the first load.

17. The delivery management system of claim 16, wherein the mobile application comprises a plurality of user interfaces, the plurality of user interfaces comprising an assigned loads user interface, an available loads user interface, an active load user interface, and an event list user interface.

18. The delivery management system of claim 16, wherein the pickup location is a store owned by the entity;

wherein the drop-off location of the first load is a mixing center owned by the entity; and wherein sending the first load to the first mobile device includes:

receiving a selection of the first carrier organization;

receiving a selection of a dispatcher of the one or more dispatchers of the first carrier organization; and sending the first load to the dispatcher;

wherein a user of the first mobile device is the dispatcher of the first carrier organization, and wherein a user of the second mobile device is a deliverer of the one or more deliverers of the first carrier organization.

19. The delivery management system of claim 18, wherein the delivery management platform is further configured to:

record the event in an event log;

store carrier information;

wherein each delivery of the plurality of deliveries is generated based on one or more customer orders.

* * * * *